(12) United States Patent
Marques et al.

(10) Patent No.: US 9,798,432 B2
(45) Date of Patent: Oct. 24, 2017

(54) CAPACITIVE TOUCH SENSOR WITH POLARITY NORMALIZATION

(71) Applicant: Displax S.A., Braga (PT)

(72) Inventors: Pedro Luis Fernandes Marques, Longos-Guimaraes (PT); Miguel Angelo Magalhaes Fonseca, Braga (PT); José Miguel Fernandes Peixoto de Oliveira, Agua Longa (PT); António Augusto Babo de Carvalho, Braga (PT)

(73) Assignee: Displax S.A., Braga (PT)

( * ) Notice: Subject to any disclaimer, the term of this patent is extended or adjusted under 35 U.S.C. 154(b) by 139 days.

(21) Appl. No.: 14/882,003

(22) Filed: Oct. 13, 2015

(65) Prior Publication Data
US 2016/0282986 A1    Sep. 29, 2016

Related U.S. Application Data

(60) Provisional application No. 62/139,288, filed on Mar. 27, 2015.

(51) Int. Cl.
G06F 3/044 (2006.01)
G06F 3/041 (2006.01)

(52) U.S. Cl.
CPC ........... *G06F 3/044* (2013.01); *G06F 3/0416* (2013.01); *G06F 3/0418* (2013.01)

(58) Field of Classification Search
CPC ....... G06F 3/044; G06F 3/0416; G06F 3/0418
See application file for complete search history.

(56) References Cited

U.S. PATENT DOCUMENTS

| 6,198,469 B1 * | 3/2001 | Tjandrasuwita ..... G09G 3/3622 345/690 |
| 8,610,443 B1 | 12/2013 | Ryshtun et al. |
| 8,836,669 B1 | 9/2014 | Ogirko et al. |
| 2005/0122785 A1 | 6/2005 | Umeda et al. |
| 2009/0322351 A1 | 12/2009 | McLeod |

(Continued)

OTHER PUBLICATIONS

European Search Report in European Application No. EP 16 39 8003, dated Aug. 19, 2016, 1 page.

(Continued)

*Primary Examiner* — Kevin M Nguyen
(74) *Attorney, Agent, or Firm* — Fish & Richardson P.C.

(57) ABSTRACT

This application relates to a projected capacitive touch sensor with polarity normalization. The sensor includes a sensor grid including one or more electrically conductive rows and one or more electrically conductive columns. The sensor further includes a first column multiplexer that is connected to a first portion of the one or more electrically conductive columns. The sensor further includes a second column multiplexer that is connected to a second portion of the one or more electrically conductive columns. The sensor further includes a polarity switching circuit that is configured to determine a polarity of a differential signal generated from an output of the first column multiplexer and an output of the second column multiplexer, and based on determining the polarity of the differential signal, determining whether to switch the polarity of the differential signal.

20 Claims, 24 Drawing Sheets

(56) References Cited

U.S. PATENT DOCUMENTS

| | | |
|---|---|---|
| 2011/0234508 A1* | 9/2011 | Oda ........................ G06F 3/044 |
| | | 345/173 |
| 2011/0254802 A1 | 10/2011 | Philipp |
| 2011/0273192 A1 | 11/2011 | Huang et al. |
| 2012/0050229 A1 | 3/2012 | Tenuta et al. |
| 2013/0076646 A1 | 3/2013 | Krah et al. |
| 2013/0307601 A1 | 11/2013 | Castor-Perry |
| 2014/0078101 A1 | 3/2014 | Katsurahira |
| 2014/0125623 A1 | 5/2014 | Atkinson et al. |
| 2015/0035794 A1* | 2/2015 | Zhitomirskiy .......... G06F 3/044 |
| | | 345/174 |
| 2016/0282985 A1 | 9/2016 | Marques et al. |

OTHER PUBLICATIONS

European Search Report in European Application No. EP 16 39 8004, dated Aug. 19, 2016, 1 page.

\* cited by examiner

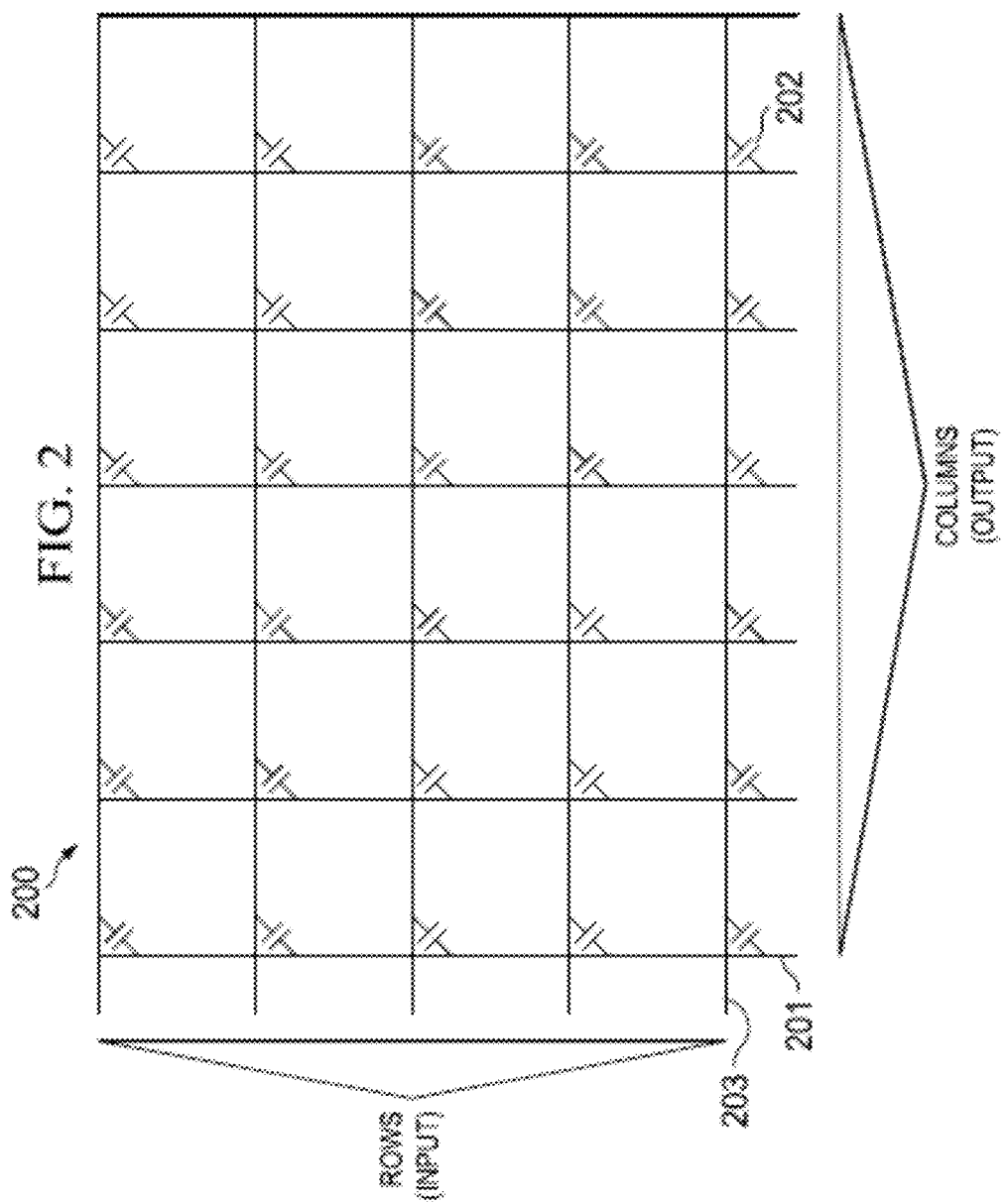

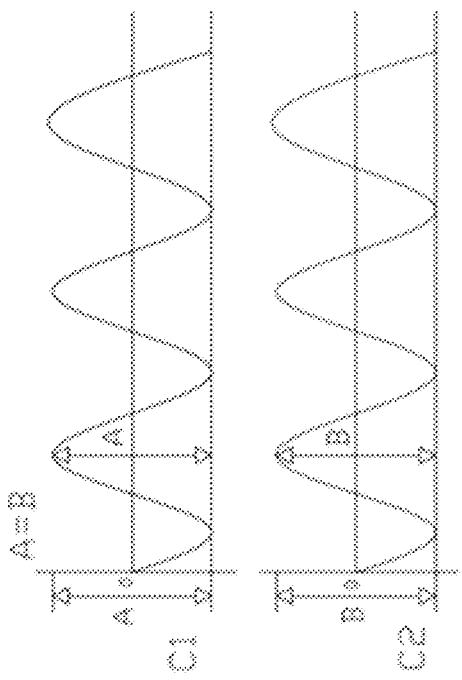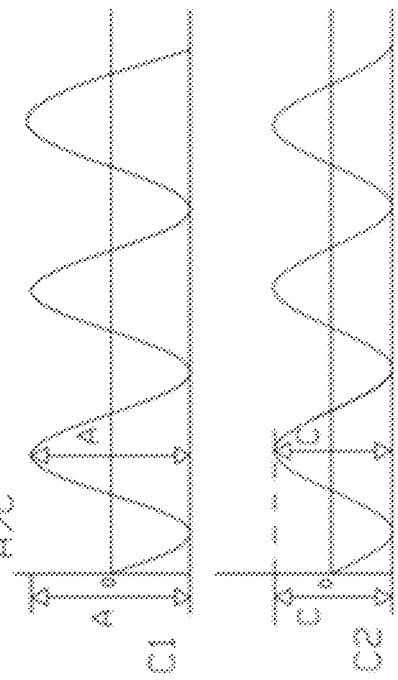
FIG. 9A
FIG. 9B

CAPACITIVE TOUCH SENSOR WITH POLARITY NORMALIZATION

CROSS REFERENCE TO RELATED APPLICATION

This application claims the benefit of U.S. Patent Application No. 62/139,288, filed Mar. 27, 2015, the contents of which are incorporated by reference.

TECHNICAL FIELD

The present disclosure relates to a projected capacitive touch sensor.

BACKGROUND

Touch-sensitive displays are widely employed for an expanding variety of applications ranging from mobile devices to fixed devices.

Projected Capacitive Technology (PCT) is becoming one of the most significant touch technologies for applications ranging from mobile devices to collaborative business and development. PCT refers to two main sensing methods called "self-capacitance" and "mutual capacitance" offering different performance characteristics and applications. Driven by the increasing number of users of touch-enabled mobile devices, consumer and professional expectations for touch applications have moved far beyond single-touch requirements into the realm of multi-touch and multi-user capabilities.

SUMMARY

A touch screen sensor includes a grid of electrically conductive rows and columns that generate a signal based on electrical charges that accumulate on the grid when a finger is near the touch screen. To identify the location of the finger, the control circuitry of the touch screen sensor reads signals received from the columns and identify the column with the highest signal level. To improve the accuracy of the touch screen sensor, the control circuitry computes a differential signal based on the difference between the signals of adjacent columns. In order to maintain uniformity in the polarity of the differential signals, the control circuitry reverses the polarity in half of the differential signals. In doing so, the control circuitry generates differential signals that are a difference of a left column signal minus a right column signal or vice versa.

As an example, the control circuitry receives signals from a first column and a second column. Because of the configuration of the multiplexers that transmit the column signals to the differential circuit, the differential circuit generates a differential signal that is the difference of the second column signal minus the first column signal. If the control circuitry receives signals from the second column and a third column, then because of the configuration of the multiplexers, the differential circuit generates a differential signal that is the difference of the second column signal minus the third column signal. For uniformity in the polarity of the differential signals, the differential signal should be the difference of the third column signal minus the second column signal. Therefore, the control circuitry is configured to switch the third column signal and the second column signal so that differential circuit generates difference of the third column signal minus the second column signal.

One innovative aspect of the subject matter described in this specification may be implemented in a projected capacitive touch sensor that includes a sensor grid including one or more electrically conductive rows and one or more electrically conductive columns; a first column multiplexer that is connected to a first portion of the one or more electrically conductive columns; a second column multiplexer that is connected to a second portion of the one or more electrically conductive columns; a polarity switching circuit that is configured to determine a polarity of a differential signal generated from an output of the first column multiplexer and an output of the second column multiplexer; and based on determining the polarity of the differential signal, determining whether to switch the polarity of the differential signal.

These and other implementations can each optionally include one or more of the following features. The polarity switching circuit is configured to determine a polarity of the differential signal based on (i) a first location of a first electrically conductive column selected as the output of the first column multiplexer and (ii) a second location of a second electrically conductive column selected as the output of the second column multiplexer. The first portion of the one or more electrically conductive columns and the second portion of the one or more electrically conductive columns are interleaved. An electrically conductive column located on an edge of the sensor grid is connected to both the first column multiplexer and the second column multiplexer. The action of determining the polarity of the differential signal includes determining that the differential signal is based on the output of the first column multiplexer minus the output of the second column multiplexer, and determining whether to switch the polarity of the differential signal comprises determining not to switch the polarity of the differential signal.

The action of determining the polarity of the differential signal includes determining that the differential signal is based on the output of the second column multiplexer minus the output of the first column multiplexer, and determining whether to switch the polarity of the differential signal comprises determining to switch the polarity of the differential signal. The sensor includes a third column multiplexer that is connected to a third portion of the one or more electrically conductive columns; a fourth column multiplexer that is connected to a fourth portion of the one or more electrically conductive columns; and an additional polarity switching circuit that is configured to determine a polarity of an additional differential signal generated from an output of the third column multiplexer and an output of the fourth column multiplexer; and based on determining the polarity of the additional differential signal, determining whether to switch the polarity of the differential signal, where a first block of consecutive electrically conductive columns of the sensor grid includes the first portion of the one or more electrically conductive columns and the second portion of the one or more electrically conductive columns, and where a second block of consecutive electrically conductive columns of the sensor grid includes the third portion of the one or more electrically conductive columns and the fourth portion of the one or more electrically conductive columns.

An electrically conductive column located in the first block is connected to both the first column multiplexer and the third column multiplexer. A first electrically conductive column selected as the output of the third column multiplexer is adjacent to a second electrically conductive column selected as the output of the fourth column multiplexer, the first electrically conductive column being located in the second block and the second electrically conductive column being located in the first block. The polarity switching circuit is a double pole double throw switch. A first electrically conductive column selected as the output of the first column multiplexer is adjacent to a second electrically conductive column selected as the output of the second column multiplexer. The first column multiplexer includes one more input than the second column multiplexer.

Another innovative aspect of the subject matter described in this specification may be implemented in a method that includes the actions of determining a differential signal that is based on an output of a first column multiplexer and an output of a second column multiplexer, wherein the first column multiplexer is connected to a first portion of one or more electrically conductive columns of a sensor grid and the second column multiplexer is connected to a second portion of the one or more electrically conductive columns of the sensor grid; determining a polarity of the differential signal; and based on determining the polarity of the differential signal, determining whether to switch the polarity of the differential signal.

These and other implementations can each optionally include one or more of the following features. The action of determining a polarity of the differential signal is based on (i) a first location of a first electrically conductive column selected as the output of the first column multiplexer and (ii) a second location of a second electrically conductive column selected as the output of the second column multiplexer. The action of determining the polarity of the differential signal includes determining that the differential signal is based on the output of the second column multiplexer minus the output of the first column multiplexer, and determining whether to switch the polarity of the differential signal comprises determining to switch the polarity of the differential signal. A first electrically conductive column selected as the output of the first column multiplexer is adjacent to a second electrically conductive column selected as the output of the second column multiplexer.

The actions further include determining an additional differential signal that is based on an output of a third column multiplexer and an output of a fourth column multiplexer, wherein the third column multiplexer is connected to a third portion of one or more electrically conductive columns of a sensor grid and the fourth column multiplexer is connected to a fourth portion of the one or more electrically conductive columns of the sensor grid; determining a polarity of the additional differential signal; and based on determining the polarity of the additional differential signal, determining whether to switch the polarity of the additional differential signal, where a first block of consecutive electrically conductive columns of the sensor grid includes the first portion of the one or more electrically conductive columns and the second portion of the one or more electrically conductive columns, and where a second block of consecutive electrically conductive columns of the sensor grid includes the third portion of the one or more electrically conductive columns and the fourth portion of the one or more electrically conductive columns.

Another innovative aspect of the subject matter described in this specification may be implemented in a method that includes the actions of receiving an output of a first column multiplexer and an output of a second column multiplexer, wherein the first column multiplexer is connected to a first portion of one or more electrically conductive columns of a sensor grid and the second column multiplexer is connected to a second portion of the one or more electrically conductive columns of the sensor grid; receiving a bit of a first address signal provided to the first column multiplexer; receiving a bit of a second address signal provided to the second column multiplexer; comparing the bit of the first address signal provided to the first column multiplexer with the bit of the second address signal provided to the second column multiplexer; and based on comparing the bit of the first address signal provided to the first column multiplexer with the bit of the second address signal provided to the second column multiplexer, determining whether to switch a polarity of a differential signal generated based on the output of the first column multiplexer and the output of the second column multiplexer.

These and other implementations can each optionally include one or more of the following features. The action of determining whether to switch a polarity of a differential signal generated based on the output of the first column multiplexer and the output of the second column multiplexer includes determining to switch the polarity of the differential signal generated based on the output of the first column multiplexer and the output of the second column multiplexer in response to comparing the bit of the first address signal provided to the first column multiplexer that matches the bit of the second address signal provided to the second column multiplexer. The action of determining whether to switch a polarity of a differential signal generated based on the output of the first column multiplexer and the output of the second column multiplexer comprises determining not to switch the polarity of the differential signal generated based on the output of the first column multiplexer and the output of the second column multiplexer in response to comparing the bit of the first address signal provided to the first column multiplexer that does not match the bit of the second address signal provided to the second column multiplexer.

Other implementations of these aspects include corresponding systems, apparatus, and computer programs recorded on computer storage devices, each configured to perform the operations of the methods and sensors.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2 illustrates components of a projected capacitive touch sensor.

FIGS. 9A-9B illustrate example differential signals.

DETAILED DESCRIPTION

The present disclosure relates to a projected capacitive touch sensor.

Figure 1:
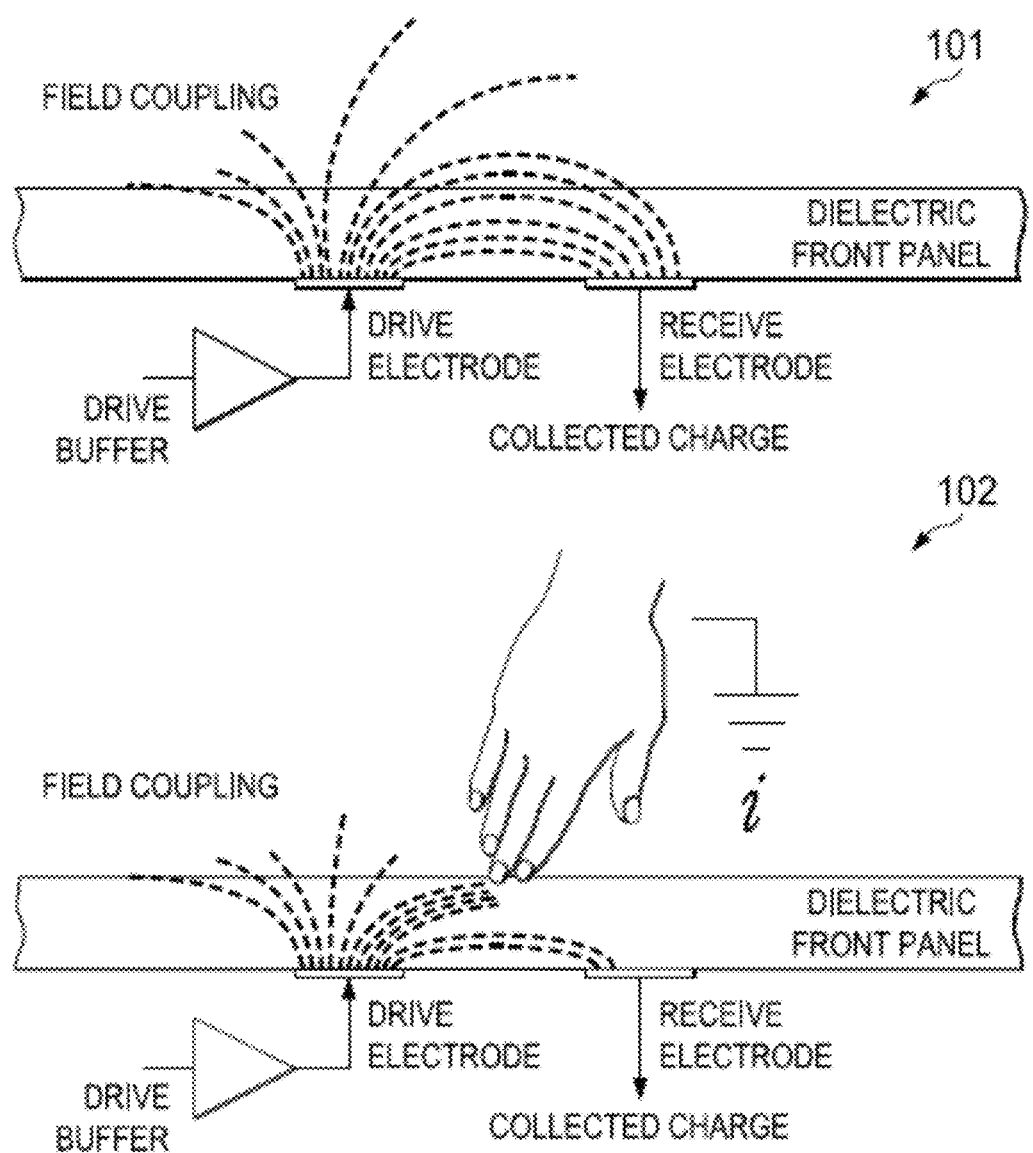
FIG. 1 illustrates in a simplified manner how projected capacitive touch sensing works.

FIG. 1 illustrates, in a simplified manner, the working principles of projected capacitive touch sensing technology. 101 is the sensor without an external conductive object in close proximity, while 102 is the sensor with an external conductive object in close proximity. PCT may be based on a grid (or matrix) made of electrically conductive material, having this material as columns and rows. The columns and rows may serve as electrodes. The detection method may be based on interference caused by an external conductive touch object (e.g., finger or conductive pointer that are grounded) on the electrostatic field generated between the rows and columns, more precisely at the interceptions between rows and columns—these interceptions may be designated as nodes. These nodes, electrically speaking, may behave like capacitors, with very low charge capacity, in the pico Farad (pF) range, and with charge variation in the femto Farad (fF) range when externally disturbed (for instance, when touching with the external object). In other words, PCT detects touch by measuring the capacitance at each addressable electrode. When a finger or a conductive object approaches an electrode, it disturbs the electromagnetic field and alters the capacitance. This change in capacitance can be measured by the electronics and then converted into X, Y locations that the system can use to detect touch.

FIG. 2 illustrates components of a projected capacitive touch sensor 200. In an aspect, an alternate current signal is injected (AC signal) in one of the rows 203 and, on each column 201, one may find the same signal with a fraction of the injected signal amplitude. The signal amplitude obtained on each column is the result of the original AC signal passing through the capacitor 202 created at the node (interception) between the selected row and the column. This sensor output amplitude may vary between columns due to physical and electrical differences that may exist for among columns (e.g., equivalent capacitors to each node have different charge capacities, thereof, different output signal values or amplitudes). For example, the electrical signal may be injected in the rows and collected at the columns, but the process works in reverse (one can inject the signals in the columns and collect it at the rows).

The signal amplitude at the columns output may be changed (e.g., it will be smaller or larger) when a conductive object, exterior to the grid, disturbs the electrostatic field created at the node between the row and column. This conductive object is, in this circuit context, the touching or "getting near" finger in the grid which will divert part of that electrostatic field to earth/ground. One may use this difference of signal amplitude (amplitude without touch minus amplitude with touch) to identify the presence of an exterior conductive object, thus, the existence of a touch event.

There are two main types of sensing methods, self-capacitance and mutual capacitance, where each has its own advantages and disadvantages. While for self-capacitance, each electrode is scanned individually, in mutual capacitance each electrode node or intersection is scanned for the determination of a touch event. Mutual capacitance may allow an unlimited number of unambiguous touches, may produce higher resolution than self-capacitance and may be less sensitive to electromagnetic interference (EMI) than self-capacitance. In self-capacitance, due to the scanning method, so-called ghost points may occur so that it may not be possible to unambiguously detect more than one touch event when using rows and columns. However, both types of sensing methods are based on a charge transfer between human-body or touch object and either single electrode or pair of electrodes.

Mutual capacitance is the intentional or unintentional capacitance between two "charge holding objects." Projected capacitance touch-screens intentionally create mutual capacitance between elements of columns and rows in the vicinity where each intersect the other. This allows the system electronics to measure each node (intersection) individually to detect multiple touches on the screen during one screen scan. When a touch object touches near an intersection or node, some of the mutual capacitance between the row and column is coupled to the touch object, which reduce the capacitance at the intersection as measured by the system electronics. This reduced capacitance crosses the "touch threshold" set by the electronics indicating a touch has occurred.

Touch sensors based on PCT may be scanned as mentioned above. The term "scanned" as used herein may mean that individual electrodes (e.g. rows or columns) intersections or nodes are measured, e.g. one-by-one in a cycle. Mutual-capacitance touch screens may use a scanning method that measures the capacitance at each row and column intersection. In this scanning method, the controller drives a single column (Y) and then scans every row (X) (or vice versa) that intersects with that column, measuring the capacitance value at each X-Y intersection. This process may be repeated for every column and then the entire cycle starts over. The scanning rate may be more than 20 Hz, for example, up to 200 Hz, 400 Hz, or 500 Hz. The sensor grid may have any number of columns and rows, for example, 64-700 columns and 36-400 rows, for example 168 columns and 96 rows.

Figure 3A:
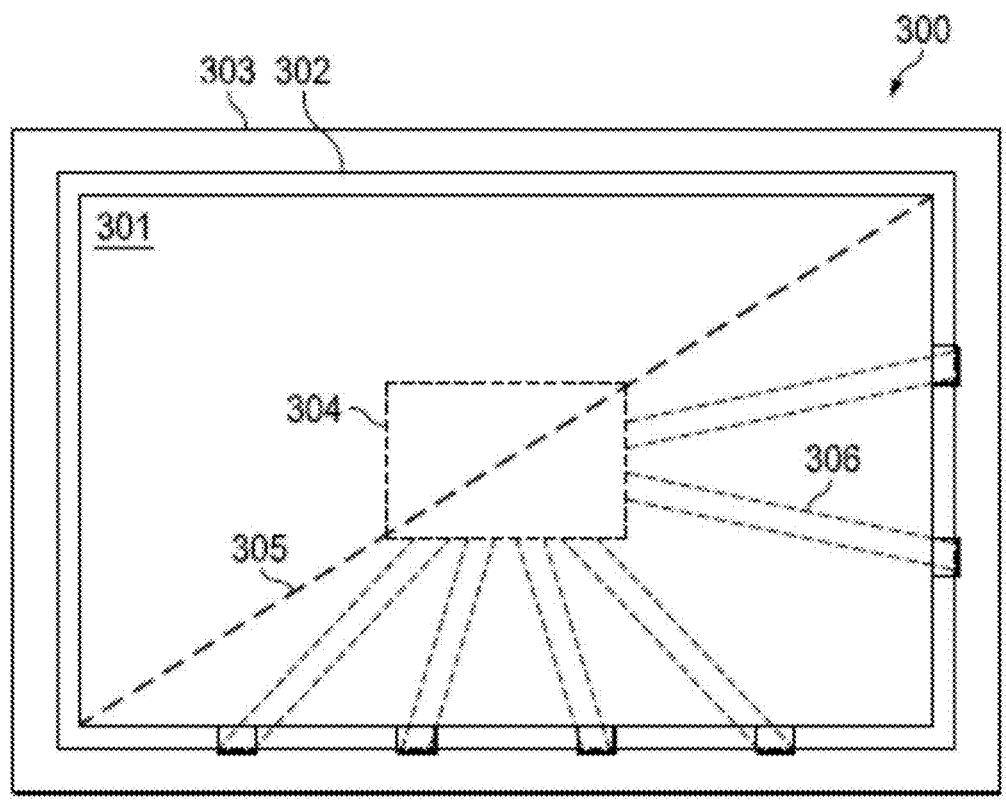
FIG. 3A illustrates a front view of a touch display device based on a projected capacitive touch sensor according to an embodiment of the present disclosure.
Figure 3B:
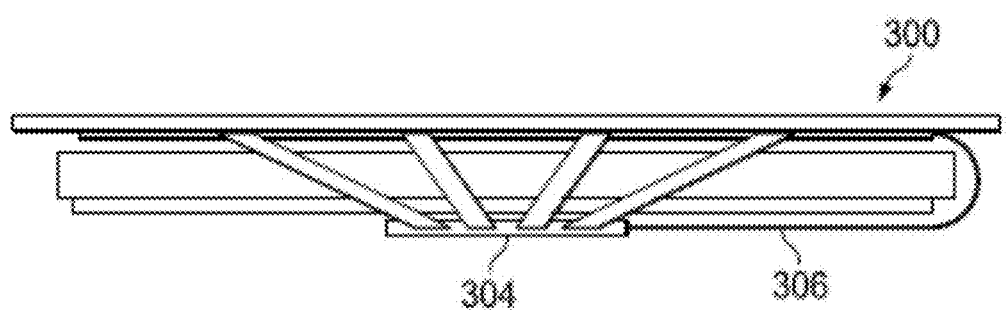
FIG. 3B illustrates a top view of a touch display device based on a projected capacitive touch sensor according to an embodiment of the present disclosure.

FIG. 3A illustrates a front view of the projected capacitive touch display device 300 and FIG. 3B illustrates a top view of the projected capacitive touch display device 300. The projected capacitive touch sensor may include a sensor grid 301 with diagonal 305, a display layer 302, a glass (or other transparent, non-conductive material, like acrylic) cover layer 303, one or more controllers 304 and one or more flexible cables 306. The controller, despite being shown at the back of the display, can be located anywhere as long as the flexible cables 306 coming from the sensor film can reach it. Not shown here is the host system (e.g., a regular PC) where the controller 304 and the display 302 are connected. The sensor grid 301 may be laminated to the glass 303 (or other transparent, non-conductive material, like acrylic). The diagonal 305 may exceed 32 inches, preferably may be 40 inches to 90 inches, more preferably may be up to 150 inches.

The layers forming the sensor grid 301, after being stacked up, may create a grid of interceptions between the conductive material (e.g., copper, gold, silver, carbon nanotubes, graphene; generically any conductive material which may allow fine traces, e.g. below 10 μm in width) rows and columns, which are previously created in one or more row or column layers by deposition, printing, etching, electroplating or other method of making conductive structures in (e.g. flexible) substrates (e.g.). Additionally, conductive connecting traces (e.g. buses) are also created at the borders in order to allow the electrical connection of the rows/columns to the flexible cables which will, then, connect to the controller. The rows and their traces may not directly (e.g., conductively) touch/connect electrically to the columns and column traces, e.g., there must may be electrical isolation between rows and columns, being it by spatial separation (zones where rows and columns do not overlap), or being it by using a isolating (e.g., electrically non-conductive) layer (e.g. an optically clear adhesive (OCA)) in between. The isolation material may act as dielectric, e.g., at the interception/node zones.

As used in the present disclosure, the term "controller" and "host system" is intended to encompass any suitable processing device. For example, although FIGS. 3A, 3B illustrate a single backend controller 304, touch display device 300 can be implemented using any number of controllers. Indeed, the controller 304 and the host system may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated controller 304 and the host system may be adapted to execute any operating system, including Linux®, UNIX®, Windows®, Mac OS®, or any other suitable operating system. The controller and/or host system may be configured to execute any computer instructions or software that can be used to operate the touch display device 300 or that can provide functionality for one or more users of the touch display device 300, wherein the users may activate the functionality through touching predetermined locations on the cover layer 303, and wherein the touched location is associated with an icon displayed by the display layer 302, and wherein the user-initiated touch event is sensed by the sensor grid 301 and the controller 304. In this manner, the user may activate software or hardware functionality by perturbing the electrical field at a node of a row and a column of the sensor grid 301 by using a finger or a conductive object. For example, the perturbation of the electrical field triggers an action of software running on the controller 304 or host system.

Figure 4A:
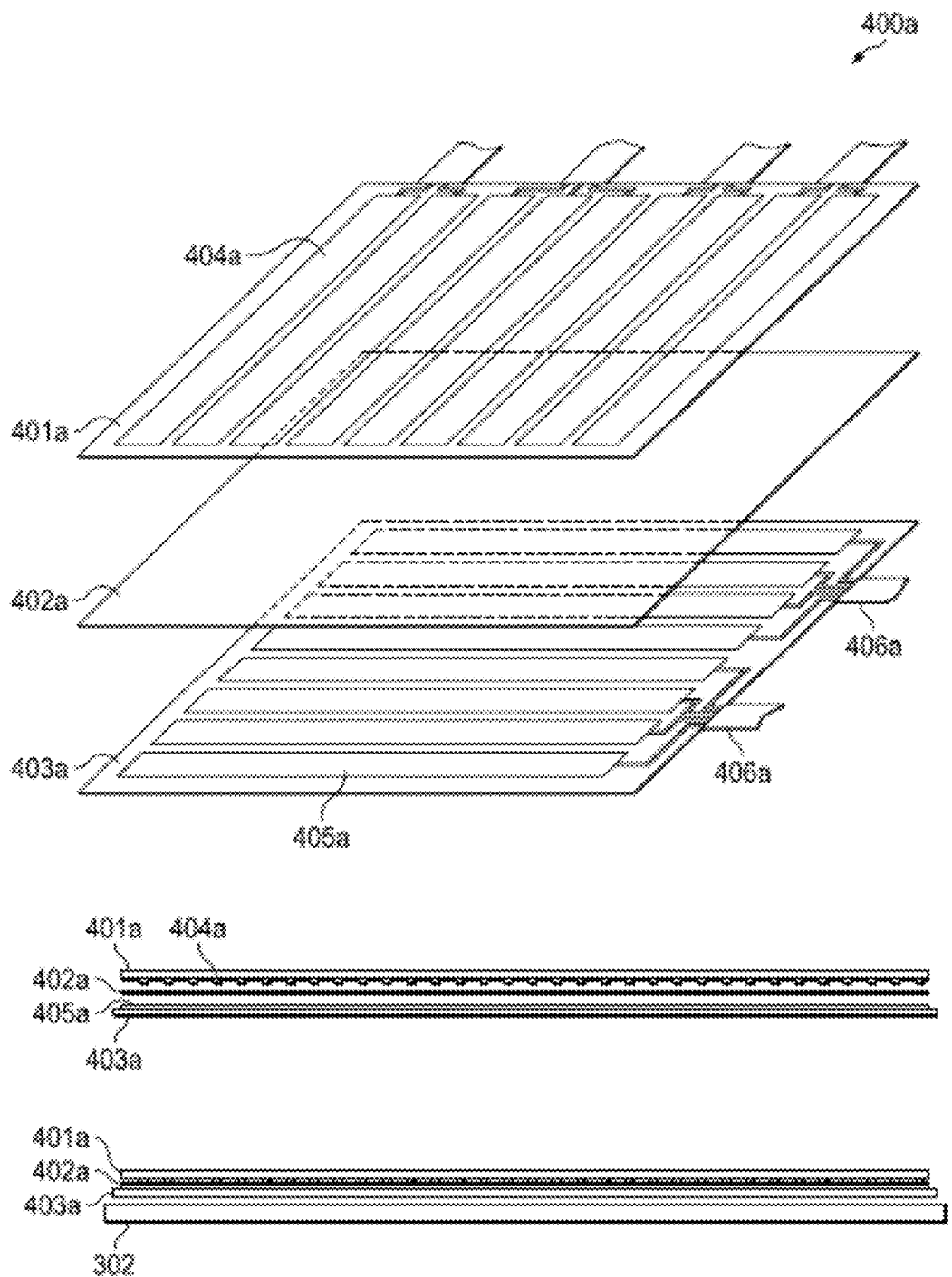
FIG. 4A illustrates layers of the sensor grid in a face-to-face stacking according to an embodiment of the present disclosure.

FIG. 4A illustrates layers of the sensor grid 301, 400a in a face-to-face stacking according to an embodiment of the present disclosure. The sensor grid may comprise one or more layers, which may be at least one of: conductive row layer 403a, conductive column layer 401a, optically clear adhesives 402a, substrates, covers, or additional dielectric bridges. For example, the sensor grid 301, 400a may include a conductive row layer 403a, a conductive column layer 401a and an optically clear adhesive (OCA) 402a. The rows 405a and columns 404a may be electrodes that are conductively connected via cables or wires 406a with the controller 304. FIG. 4A illustrates the sensor grid before and after lamination, and relative to the display layer 302. The materials used for the bridges and the OCA may be optically clear or transparent, and/or flexible materials, for example, materials with maximum haze below about 1%, and/or, with minimum light transmission, for example, above about 99%, for example an acrylic adhesive. The properties for bridge material may be: transparent, non-conductive, flexible, and/or dielectric constant substantially equivalent to glass, acrylic, or polyester.

The sensor grid layers stacking may be dependable on how the conductive rows and columns are created. There are three layer stacking configurations normally used: separated rows and columns layers facing each other (face to face stacking, FIG. 4A), rows and columns in the same layer (bridged stacking, FIG. 4B), rows and columns on opposite side of the same layer (dual side, FIG. 4C). The substrate layers (where the rows and columns will be created) and the cover layers may be polyethylene terephthalate (PET) films or other types of at least partially transparent (e.g. within or across the visible spectrum) and flexible materials. For example, polymethylpentene (PMP), polypropylene (PP), polycarbonate (PC), polyvinyl chloride (PVC), poly(methyl methacrylate) (PPMA), polystyrene (PS), styrene acrylonitrile (SAN), among others. Also, a flexible glass material can be used. In the next sub-sections, the aforementioned configurations are illustrated.

In this face-to-face stacking configuration 400a, the rows and the columns are created in separated layers, with the printed side facing each other. To isolate them electrically and, at the same time, act as dielectric, and to bond them when laminated, one may use a non-conductive layer of optically clear adhesive (OCA). The flexible cables may be bonded or soldered to the corresponding traces or buses (before or after the layer lamination, depending on the production process used).

Figure 4B:
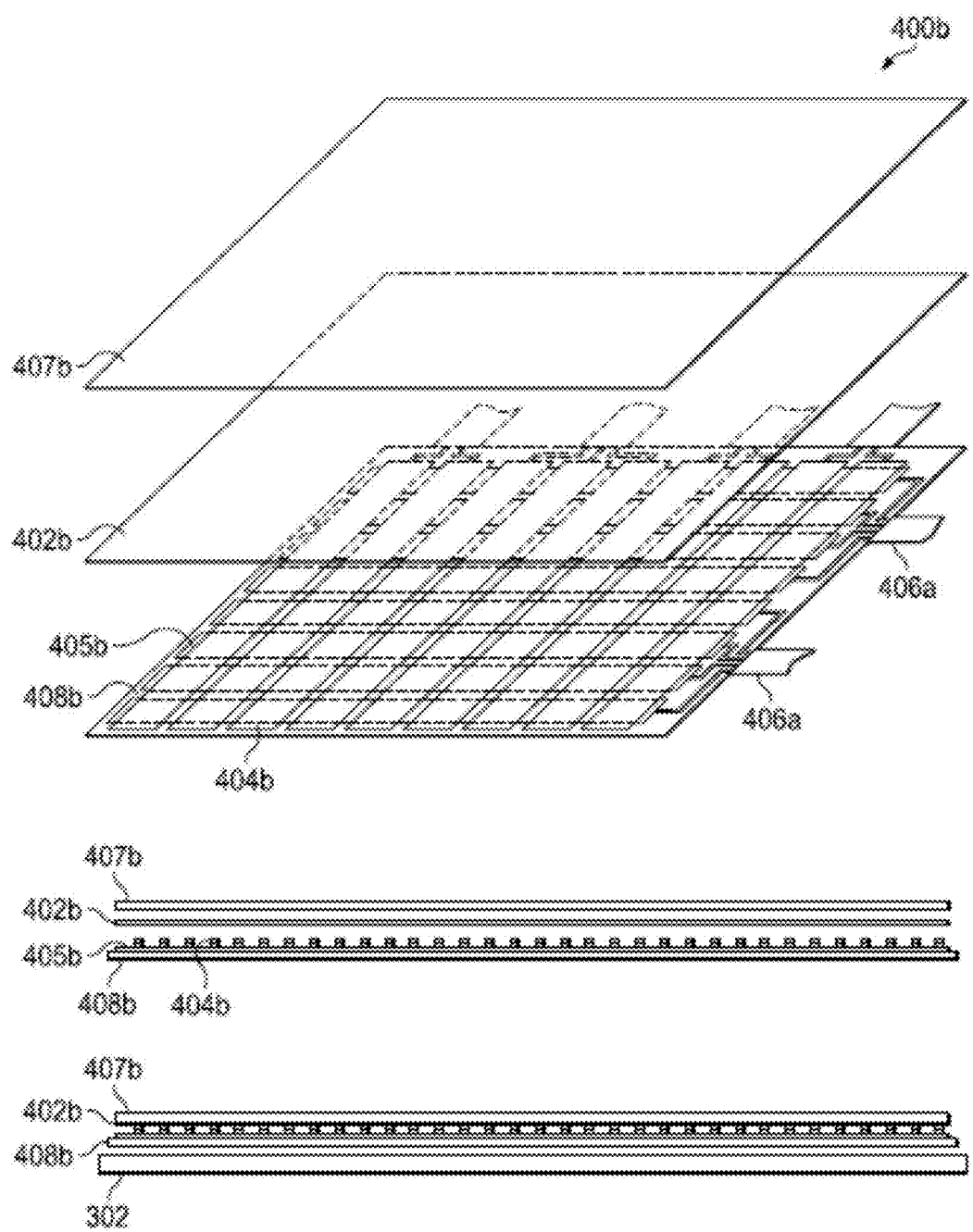
FIG. 4B illustrates layers of the sensor grid in a bridged stacking according to an embodiment of the present disclosure.

FIG. 4B illustrates layers of the sensor grid 301, 400b in a bridged stacking according to an embodiment of the present disclosure. The sensor grid may comprise one or more layers, which may be at least one of: a layer 408b shared by conductive rows 405b and conductive columns 404b, optically clear adhesives 402b, substrates, covers 407b, or additional dielectric bridges. For example, the sensor grid 301, 400b may include a layer 408b shared by conductive rows 405b and conductive columns 404b (e.g., rows and columns in the same layer 408b), and an optically clear adhesive (OCA) positioned between each row 405b and column 404b at the respective row-column-nodes. The rows 405b and columns 404b may be electrodes that are conductively connected via cables or wires 406a with the controller 304. FIG. 4B illustrates the sensor grid before and after lamination, and relative to the display layer 302.

In this bridged stacking configuration 400b, the rows and the columns may be created in the same layer 408b, having a transparent non-conductive material (e.g. OCA) between them where their projections spatially overlap. These non-conductive material blocks are called dielectric bridges. They may isolate electrically the rows and columns and act as dielectric. Also, it is used a cover layer to close and protect the rows and columns traces and an OCA layer to bond them when laminated. The flexible cables 406a may be bonded or soldered to the corresponding buses (before or after the layer lamination, depending on the production process used).

Figure 4C:
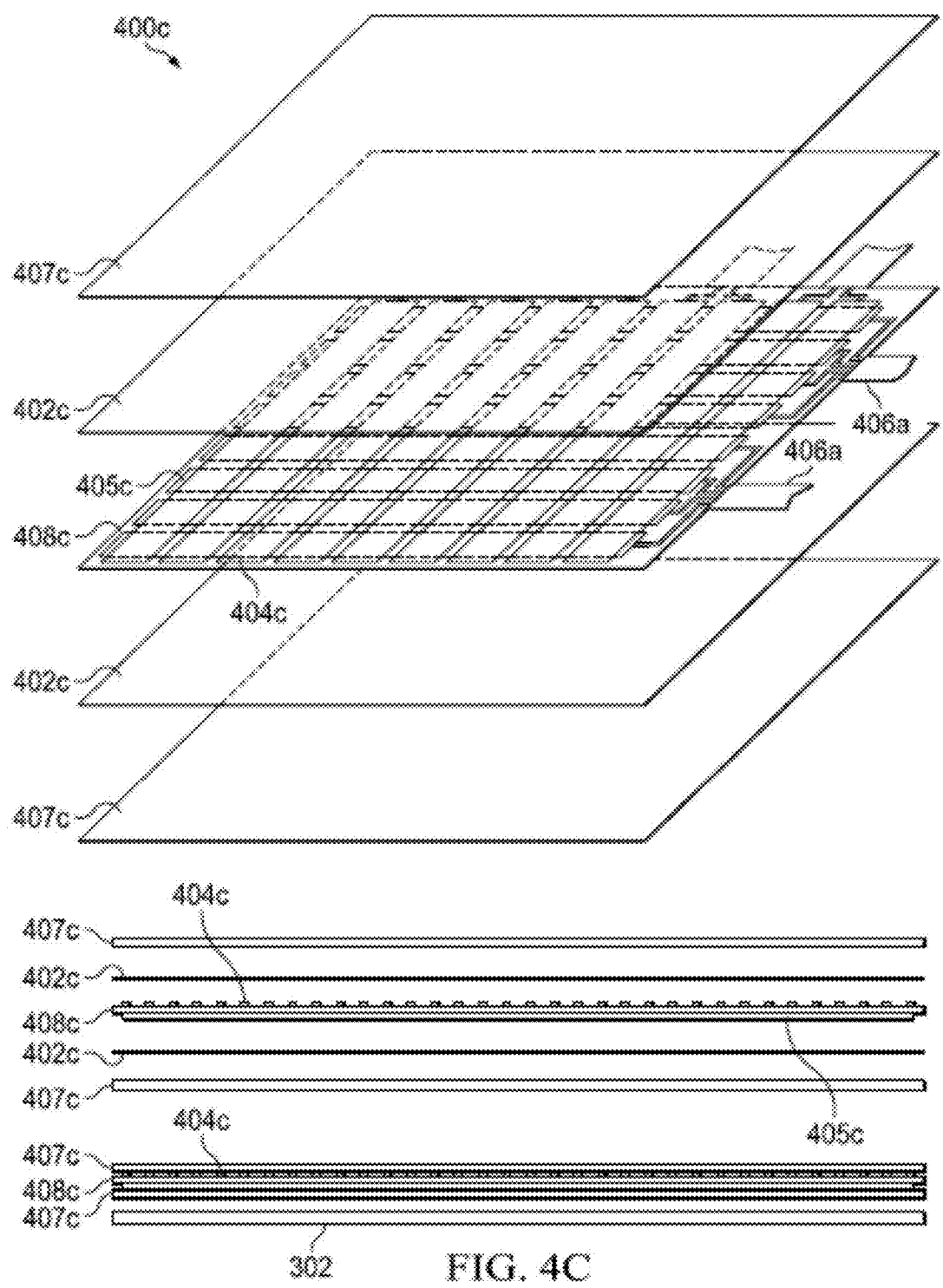
FIG. 4C illustrates layers of the sensor grid in a dual-side stacking according to an embodiment of the present disclosure.

FIG. 4C illustrates layers of the sensor grid 301, 400c in a dual-side stacking according to an embodiment of the present disclosure. The sensor grid may comprise one or more layers, which may be at least one of: a layer 408c shared by conductive rows 405c and conductive columns 404c, optically clear adhesives 402c, substrates, covers 407c, or additional dielectric bridges. For example, the sensor grid 301, 400c may include a layer 408c shared by conductive rows 405c and conductive columns 404c (e.g., rows and columns on opposite side of the same layer 408c), and one or more optically clear adhesive (OCA) layers positioned between layer 408c and one or more cover layers 407c. The rows 405c and columns 404c may be electrodes that are conductively connected via cables or wires 406c with the controller 304. FIG. 4B illustrates the sensor grid before and after lamination, and relative to the display layer 302.

In this dual-side stacking configuration 400c, the rows and the columns may be created in the same layer 408c, but on opposite sides, e.g., having the layer substrate 408c, the rows are created on the top side (e.g. top surface) and the columns on the bottom side (e.g., bottom surface), or vice-versa, of the shared layer 408c. The substrate layer may act as isolator and a dielectric. One may use a cover layer 407c on each side of the layer 408c to close and protect the rows and columns traces and the one or more OCA layers 402c, e.g., also on each side to bond them when laminated. The flexible cables 406a connect the rows and columns to the controller 304, e.g. cables 406a may be bonded or soldered to the corresponding traces or buses (before or after the layer lamination, depending on the production process used).

Figure 4D:
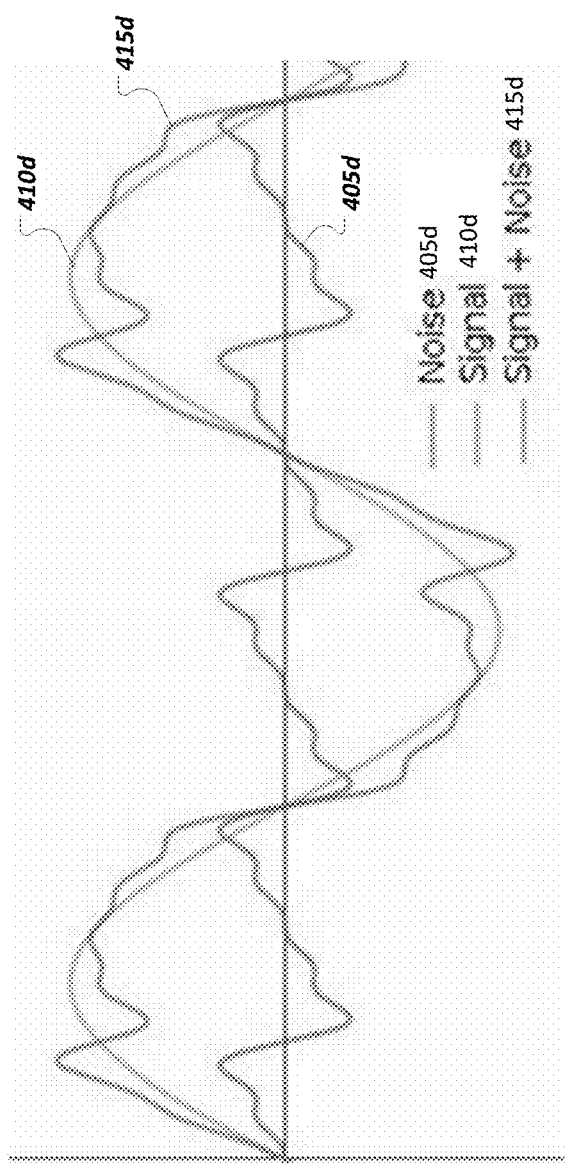
FIG. 4D illustrates an example clean signal, an example noise signal, and an example signal with noise.

Projected capacitive technology may be sensitive to external sources of interference (noise), specifically external electrostatic and electromagnetic fields. These sources can be electromagnetic fields generated by electric equipment and devices nearby the sensor grid, for instance an LCD. These external electromagnetic fields add themselves to the grid electrostatic/electromagnetic field, therefore changing the signal readouts and, consequently, report false touch events (false touches). Others external noise sources can be: the mains power lines, support equipment and devices (PC, monitors, etc) with noisy power supplies. FIG. 4D illustrates an example clean signal 410d, an example noise signal 405d, and an example signal with noise 415d. The noise signal 405d may be caused by the external noise sources and when combined with the clean signal 410d produces the signal with noise 415d. The external noise sources may be affect many circuits and affect nearby portions of the circuit with the same phase and amplitude. Therefore, the noise signal is acquired by all neighboring columns with the same intensity at each time instant. This type of noise is referred to as common mode noise.

When using analog to digital conversion circuits, common mode noise that is measured along with the signal is, in some implementations, neutralized with the application of signal processing techniques after measuring the analog signal and converting it, for example, to a digital signal. In some implementations, a circuit may eliminate the common mode noise component (or, at least, reduce it down to negligible levels, e.g., below 10% or below 1% of the signal magnitude) using differential analog signal processing.

Figure 4E:
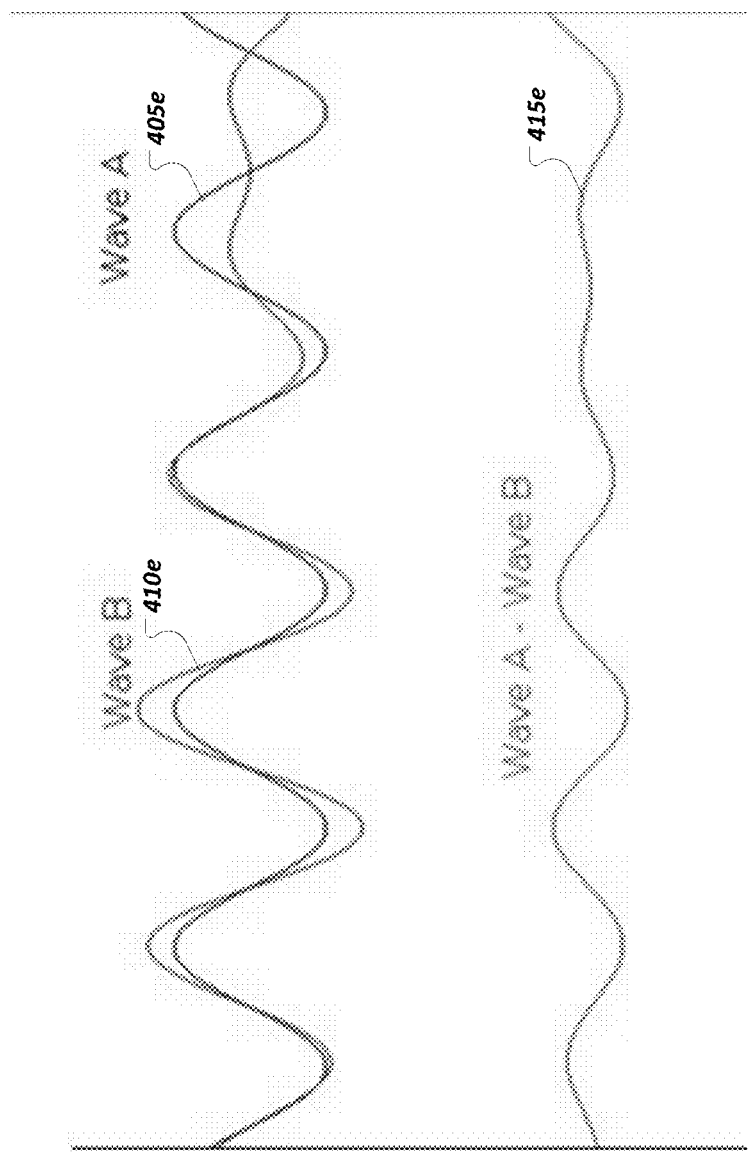
FIG. 4E illustrates two example signals and a differential signal of the two example signals.

A differential signal is characterized as the resulting signal from the difference of two absolute signals. If those two signals have any common signal component, it will be eliminated in the differentiation process. The resulting differential signal will be just the difference of the signals and may be converted to a digital value. FIG. 4E illustrates two example signals 405e and 410e and a differential signal 415e of the two example signals. The differential signal 415e is the difference of signal 405e minus signal 410e.

A sinusoidal signal may be injected in the selected row of the circuit described in this specification to charge the capacitors created by the interception nodes between the row and the columns. With every combination of two adjacent columns, the differential signal is calculated for each pair. These differential signals can be positive or negatives, having zero voltage, or ground, as reference.

Figure 4F:
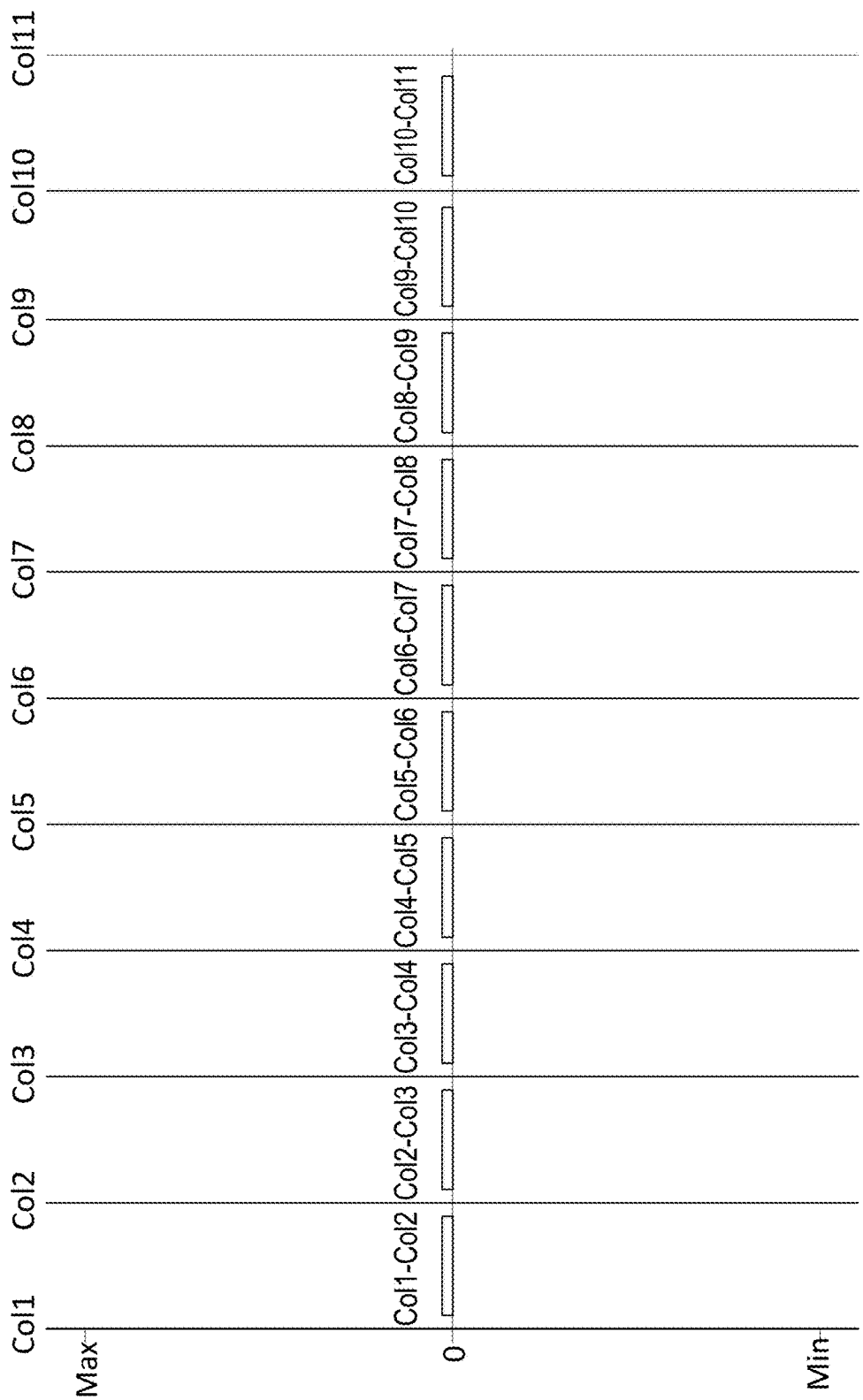
FIG. 4F illustrates example signals received from adjacent columns of a sensor grid when a user is not touching the sensor.
Figure 4G:
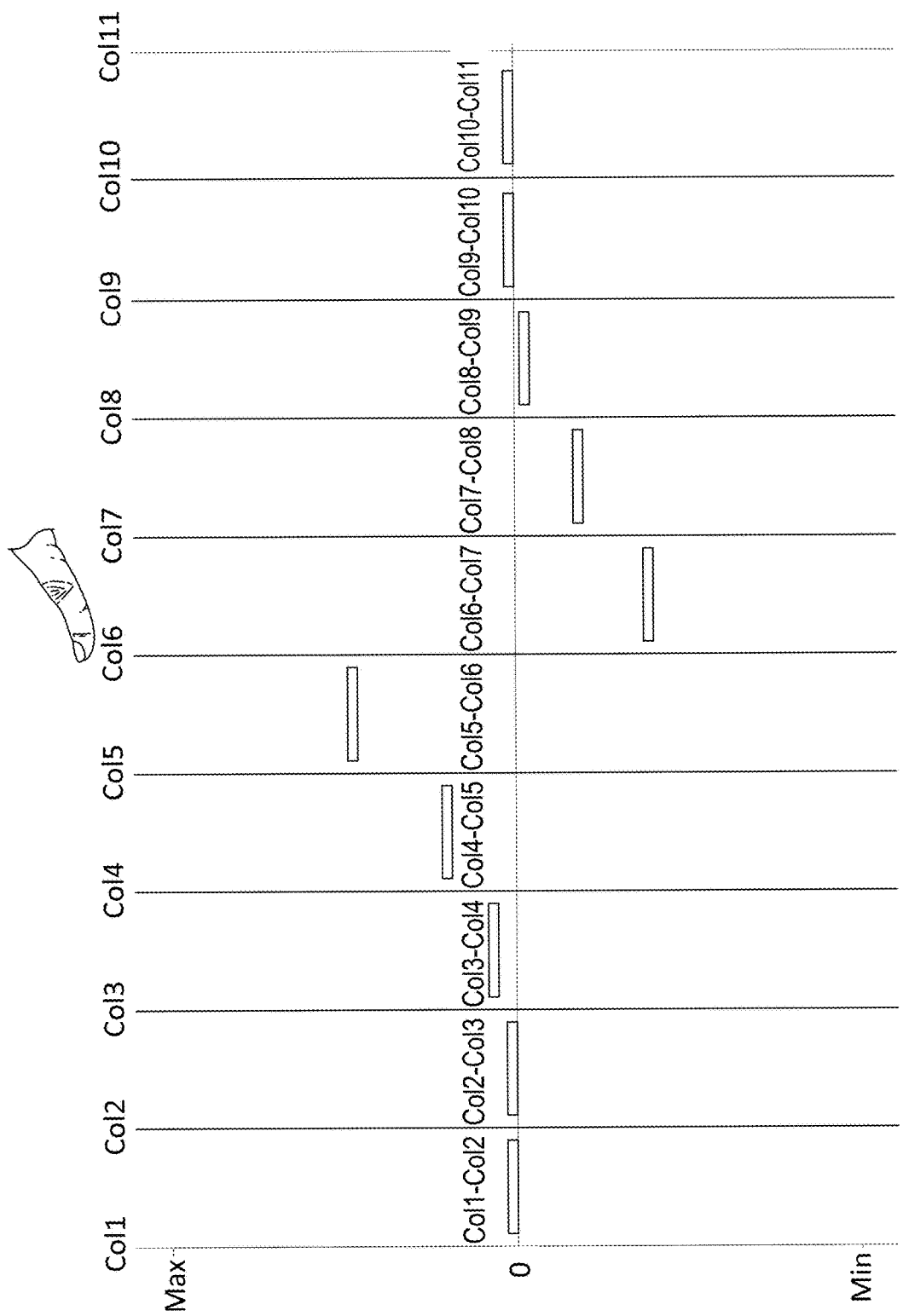
FIG. 4G illustrates example signals received from adjacent columns of a sensor grid when a user is touching the sensor.

Without touching the touchscreen surface, these signals are zero, or equal to a reference voltage, at any time. In some implementations, as the capacitors/nodes are electrically different (e.g., have slightly different charge capacities), the idle state differential signals have distinct signal levels. Therefore, a signal level normalization may be used before the digital signal processing stage. With capacitors/nodes that have equal charge capacity, their respective signal values is shown in FIG. 4F. When a finger is close or touching one of the interception nodes, the differential signal values for that node and its adjacent nodes will change, creating an oscillation curve shown in FIG. 4G.

To minimize the time needed to read and convert all the nodes, or cells, in the foil grid, and to achieve a grid of specific size, such as 96 rows by 168 columns, the 168 columns are divided in multiple (e.g., three) reception blocks. For example, the 168 columns are divided in three blocks (56 columns in each block) and each block is handled separately.

Figure 4H:
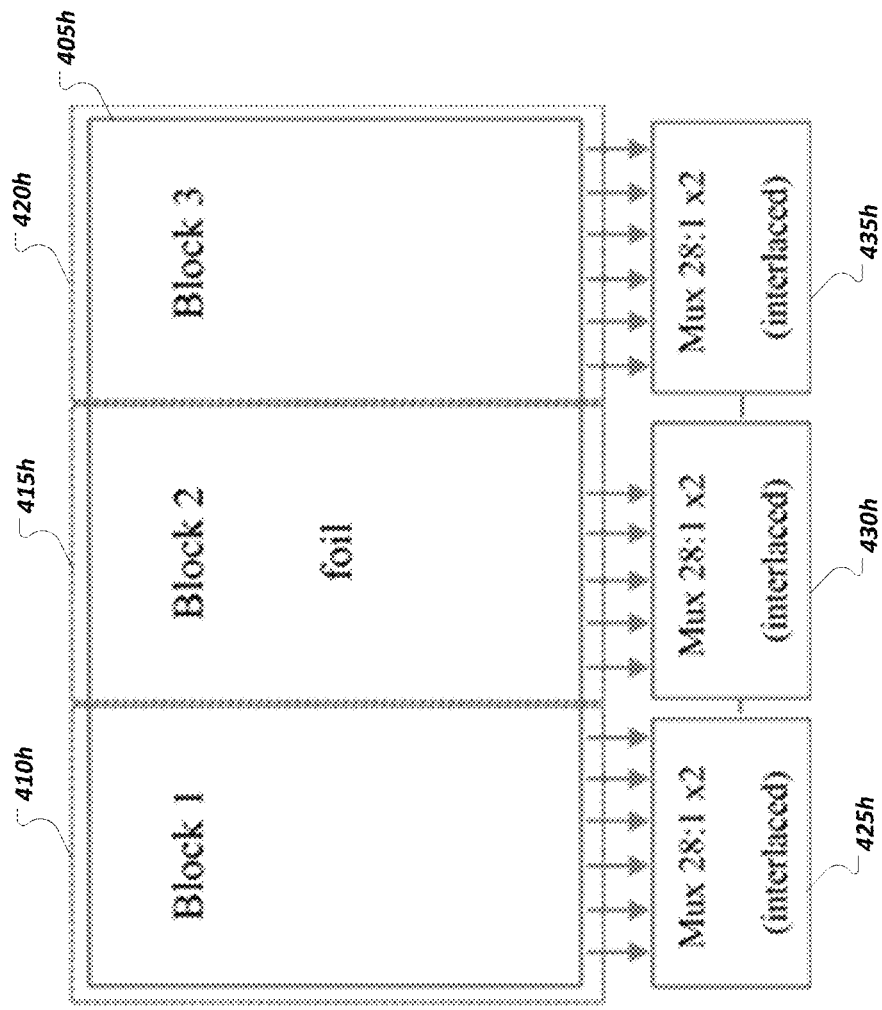
FIG. 4H illustrates an example sensor grid that includes defined blocks and corresponding multiplexers.

FIG. 4H illustrates an example sensor grid 405h that includes defined blocks 410h, 415h, and 420h and corresponding multiplexers 425h, 430h, and 435h. Other sensor grids may be divided into N blocks, being N a number equal or higher than 2. This configuration allows the simultaneous signal reception and conversion from the three blocks, reducing the total time needed to read the whole grid.

Each block 410h, 415h, and 420h feeds a multiplexing circuit 425h, 430h, and 435h composed of two multiplexers. For example, one multiplexer may be configured to multiplex 29 inputs to 1 output—29:1—and another multiplexer configured to mux 28 inputs to 1 output—28:1. In some implementations, a multiplexer may also multiplex 1 input to 1 output.

Each multiplexer pair for each block allows the simultaneous selection of two adjacent columns and, for each selection, the same multiplexers pass the selected columns signals to the differential circuit. The differential signals are converted to digital values. This configuration removes the noise common to all columns pairs, such as noise from an exterior source such as an LCD.

In some implementations, a touch sensor electronics controller that is connected to a capacitive sensor is tuned electronically and programmed for that particular sensor, so it can be adjusted to the sensor size. The size and aspect ratio of the sensor may define the capacitance and resistance of the electrodes, e.g., sensors with different sizes and/or aspect ratios will have different capacitance and/or resistance, causing different signal phase shifts. The phase shifts in the signals may be caused by the capacitance or electrode resistance or both, which, when combined, will act as a resistor-capacitor (RC) filter, thus, resulting in a phase shifted signal compared to the injected signal in the sensor, typically used as a reference when reading the signals. In some implementations, a single electronics controller is ready to be connected to different size and/or aspect ratio sensors, which may automatically adapt to the sensor capacitance and resistance. In other words, an adaptive circuit may be connected to different sensors that cause different phase shifts on the signals that are read from the sensor.

Figure 5:
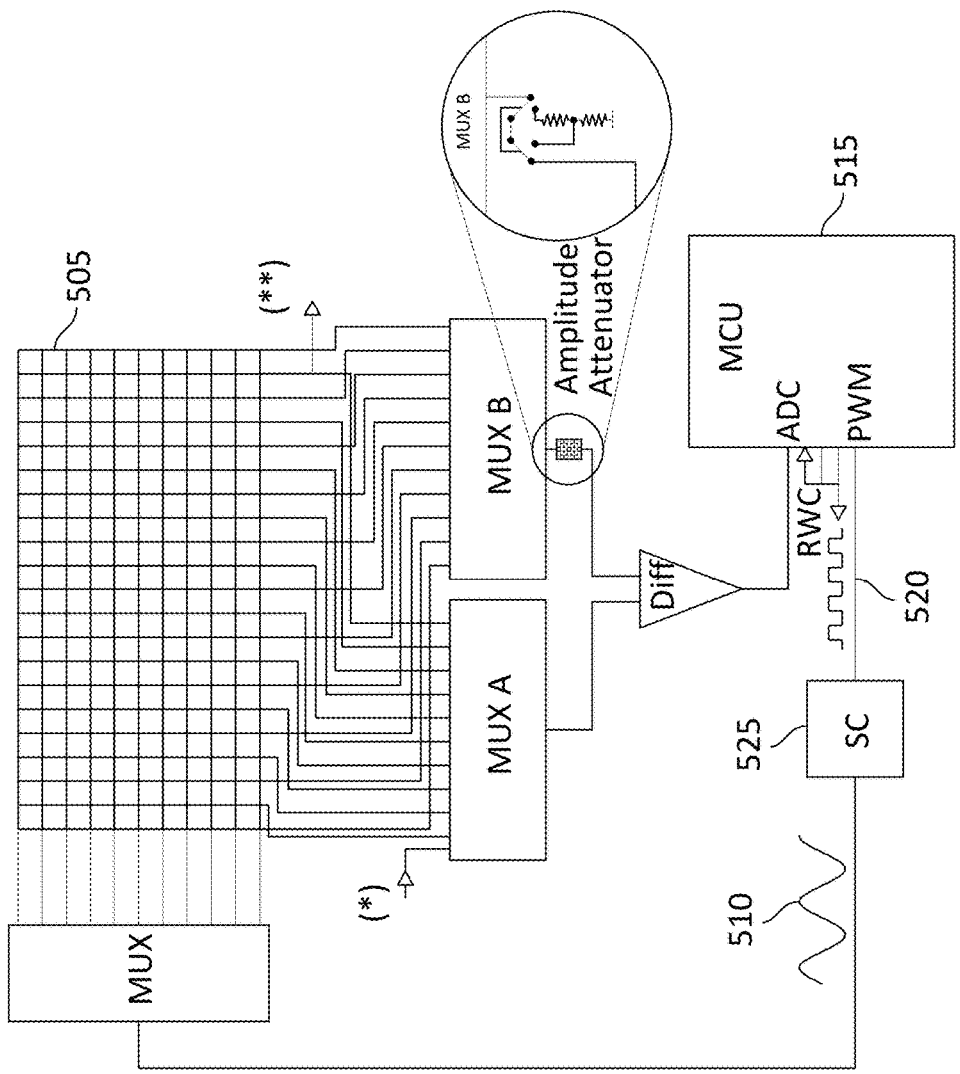
FIG. 5 illustrates an example circuit for amplitude attenuation.

In FIG. 5, the touch sensor 505 includes a set of rows and a set of columns with the set of rows over the set of columns and a grid of nodes can be obtained from the intersections between the rows and columns.

An alternate current signal 510 is injected (AC signal) in each one of the rows, one or more at a time, each with a different signal frequency. Then, on each column, the same signal is detected with a fraction of the injected signal amplitude.

The signal amplitude obtained on each column is the result of the original AC signal 510 passing through the capacitor created at the node, or intersection, between the selected row and the column. The sensor output amplitude may vary between columns due to physical and electrical differences that may exist among columns, e.g., capacitors at each node may have different charge capacities thus causing different output signal values or amplitudes.

In some implementations, the signal 510 is injected in the rows and collected at the columns, but the process works in reverse. For example, the signal may be injected in the columns and collected at the rows.

Figure 6:
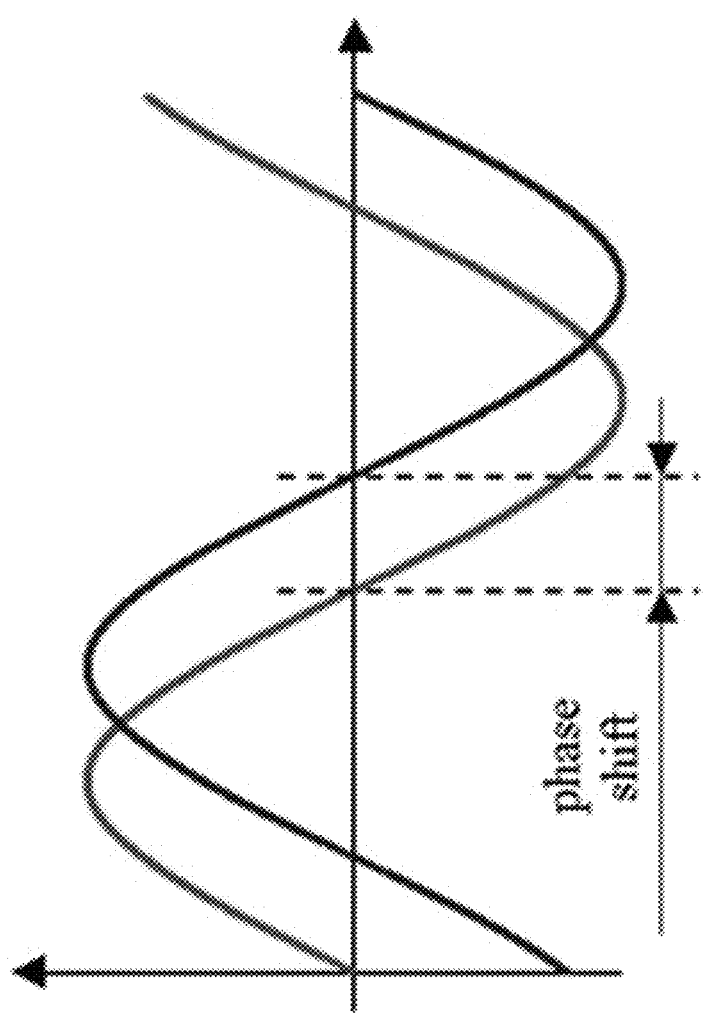
FIG. 6 illustrates an example phase shift between two signals.

The obtained signal on the columns may suffer a shift in its phase in relation with the injected AC signal phase, as illustrated in FIG. 6, that may be caused by the rows and columns conductive material resistance and/or the inherent capacitance, and also by the injection and acquisition circuitry that, in some implementations, is similar in all rows and columns and, thus, can be disregarded.

Returning to FIG. 5, the injected AC signal 510 is generated from a pulse width modulation (PWM) signal 520 coming from the microprocessor (MCU) 515. This PWM signal may be a square wave signal, with a duty cycle of less than 100%, such as 25%, 50%, or 75%, that is placed at the input of a signal converter (SC) 525, such as a square to sine wave converter, to convert it to a sine wave signal and, then, injected in the rows.

At the same time or about the same time, a second PWM signal (PWC), with the same period or about the same period as the first PWM signal, is also generated by the MCU and looped back to it so it can trigger the signal conversion process (ADC) of the acquired signals at the columns. The ADC is triggered at the falling edge of the PWM signal.

Figure 7:
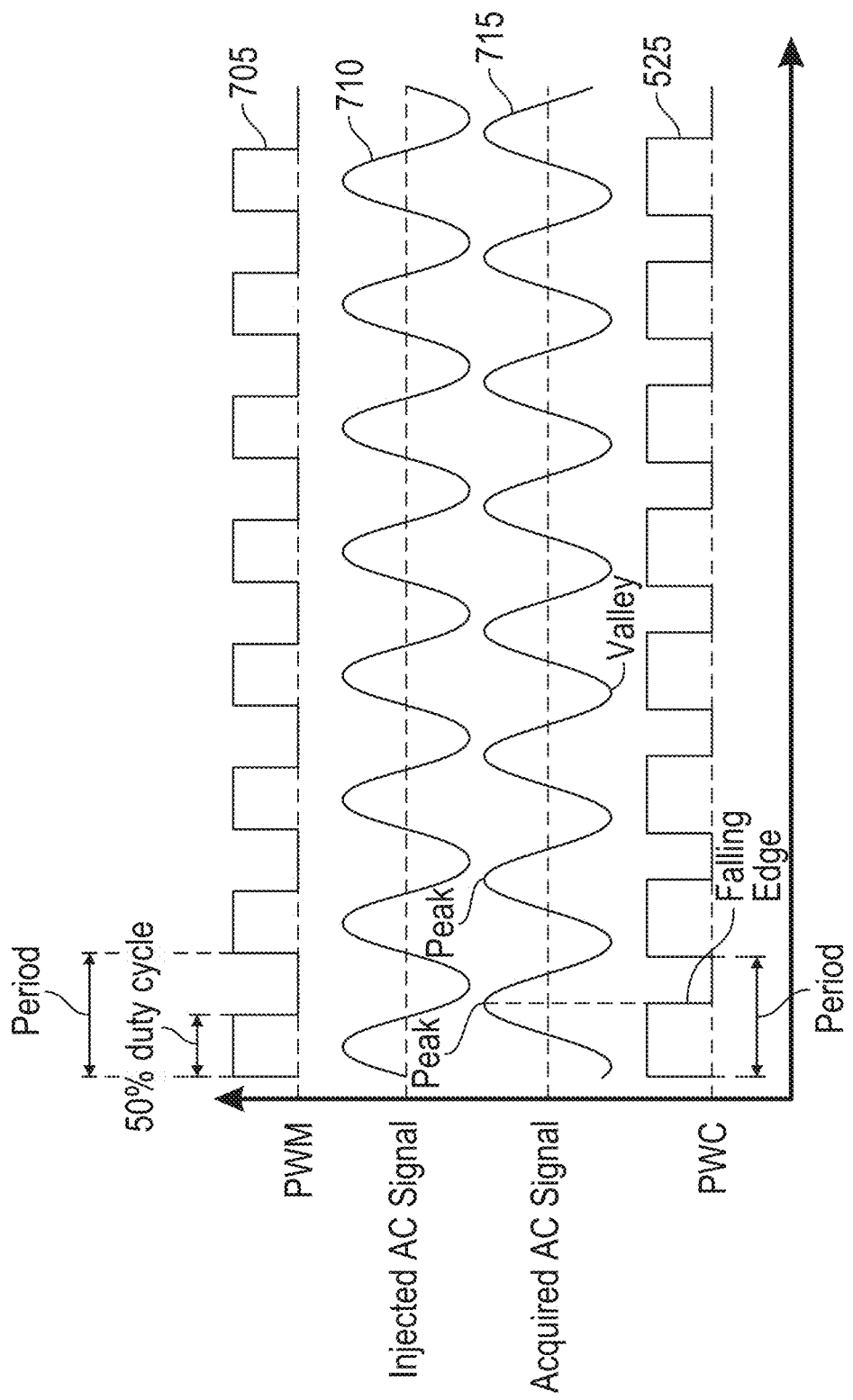
FIG. 7 illustrates an example timing diagram for signals of the amplitude attenuator circuit.

FIG. 7 illustrates the timing of the PWM signal 705, the injected AC signal 710, the acquired AC signal 715, and the PWC signal 720. To convert the injected signal 710 or the acquired signal 715 at the peaks or valleys of the signal wave, the duty cycle of the PWC signal 525 should be defined so the conversion trigger fires when a peak or valley is reached.

Figure 10:
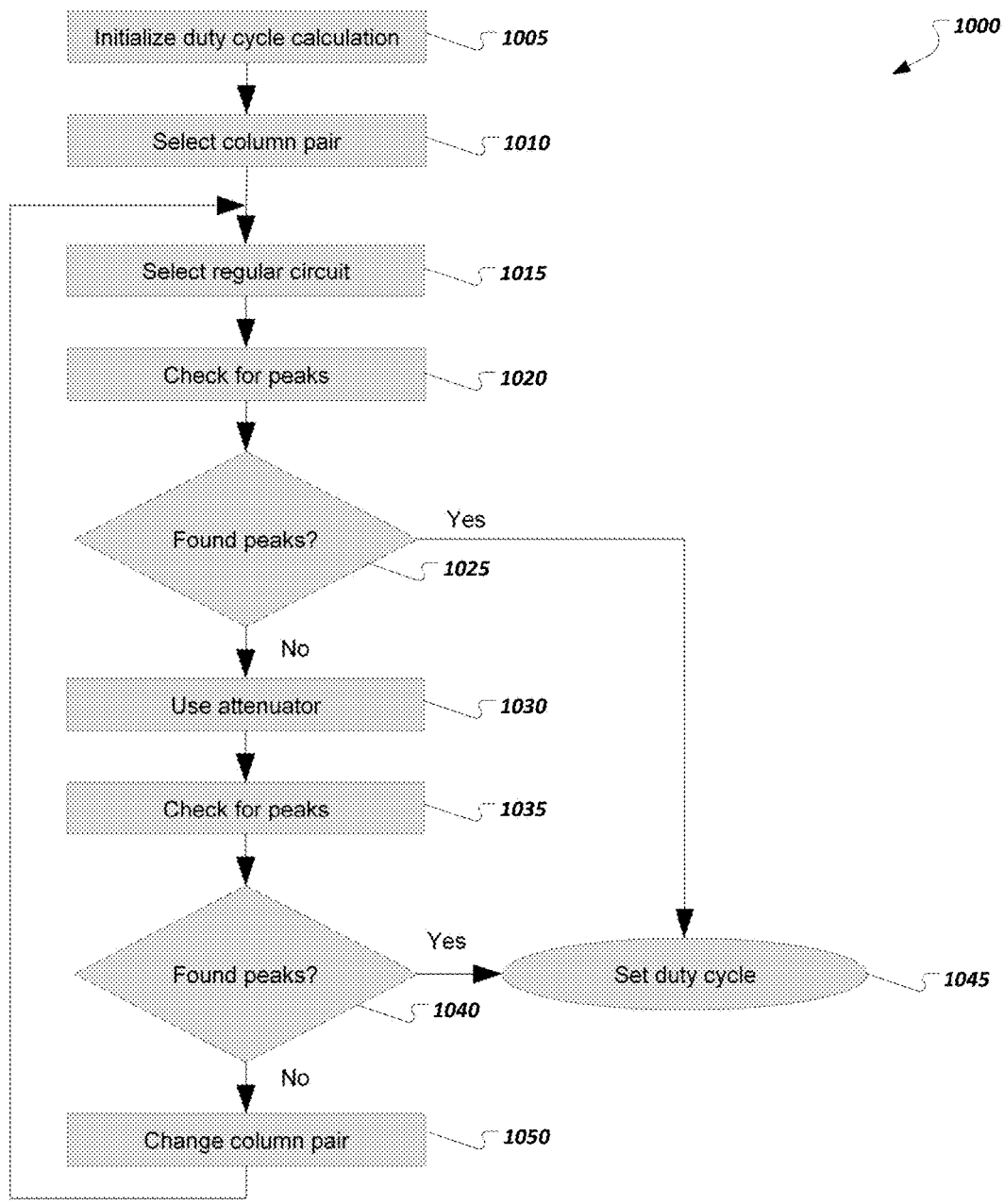
FIG. 10 illustrates an example process for detecting magnitude peaks.

The following description describes a way to check the duty cycle for the PWC regardless of the sensor size and/or its electrical characteristics. FIG. 10 illustrates the process of this method.

The acquired AC signal, e.g., the acquired AC signal 715, is an output of a differential circuit. In some implementations, two adjacent columns may output the signal with same amplitude and phase. As illustrated in FIG. 9A, C1=C2, for example, the amplitude of the signals is the same or the phase of the signals is the same or both the phase and amplitude are the same, the differential circuit will output an acquired AC signal equal to zero (or flat), without no peaks and valleys. In some implementations, all columns may output the signal with the same amplitude and phase regardless the combination of columns selected. To override this, the circuit should artificially create a column signal to be different from the other column signal that is being differentiated (e.g., artificially create a C1≠C2 scenario as illustrated in FIG. 9B).

Figure 8:
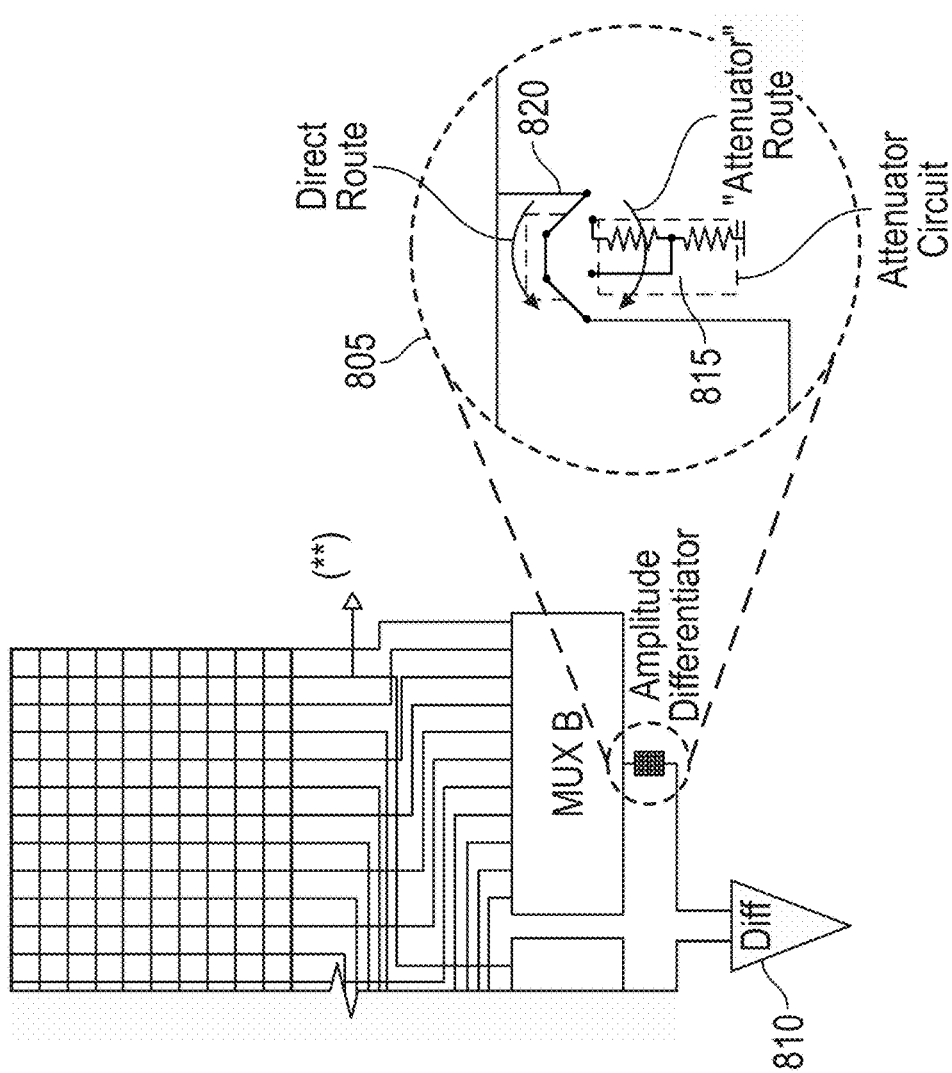
FIG. 8 illustrates various signal routes through the amplitude attenuator circuit.

The artificial change on the column signal can be implemented, as shown in FIG. 8, by adding an adaptive circuit 805 before the differential circuit 810 input for that column, wherein the adaptive circuit 805 includes an attenuator circuit, arranged in an attenuator route 815, that is configured to apply an amplitude decrease, an amplitude increase, or a phase shift to an amplitude of a signal received from the sensor grid. The adaptive circuit 805 may further include a direct signal route 820 that is configured to guide the sensor grid signal to the differential circuit 810 input without substantial (e.g., less than 1%) signal amplitude attenuation. The amplitude attenuator 805 is configured to switch between the direct route 820 and the attenuator route 815. In more detail, the adaptive circuit 805 is comprised by two switches of type SPDT (single pole double throw) or two multiplexers (1:2), implementing a signal dual route commuter, having one direct route 820 connecting the column directly to the differential circuit and the other attenuator route 815 with the signal attenuator circuit between the column output and the differential circuit input. The attenuator circuit may act as a resistor-capacitor (RC) filter.

The attenuator circuit may cause an amplitude decrease, amplitude increase, or phase shift. The objective may be to create a known signal disturbance to result in a non-flat (e.g. non-zero) differential output (e.g., C1≠C2 as illustrated in FIG. 9B).

The adaptive circuit 805 generates a different differential if the differential readings received from the multiplexer (MUX) are identical. Therefore, when selecting a column pair, if zero differential readings (e.g., C1=C2 as illustrated in FIG. 9A) are obtained with the regular circuit, the amplitude attenuator or attenuator circuit is set to generate non-zero differential reading (e.g., C1<C2 or C2>C1) using the attenuator route 815. When selecting a column pair, if non-zero differential readings (e.g., C1≠C2 as illustrated in FIG. 9B) are obtained, the direct route 820 is used instead. The resistance and/or capacity of the adaptive circuit may be sized to render the non-zero differential signal. For example, the resistance and/or capacity of the direct route 820 and/or the attenuator route 815 may be sized to render the non-zero differential signal.

FIG. 10 illustrates an example process 1000 for detecting magnitude peaks. The process 1000 may be used by an amplitude attenuator to reduce the amplitude of a wave signal coming from the multiplexer without disturbing the waveform of the signal.

With the multiplexer the signal provided from the sensor foil is processed and the duty cycle is calculated (1005). To calculate the duty cycle, the wave signal is read by selecting pair of consecutive columns (1010) using the direct path (e.g., the direct route 820) (1015). On the selected column pair, a check for magnitude signal peaks is executed to determine a differential reading (1020). When performing this operation, the process may find peaks or not find any peaks (1025).

When selecting a column pair, a few preliminary differential reading are performed using the regular circuit. If zero differential readings are obtained (e.g., C1=C2 as illustrated in FIG. 9A), the amplitude attenuator (1030) is set to generate non-zero differential reading (C1<C2 or C2>C1). If non-zero differential readings are obtained, the regular circuit is used instead, and the amplitude attenuator is not set.

The search for peaks (1025 and 1040) on the selected pair of columns (1050) is performed until peaks are found. When the peak is found, the duty cycle is, at this point defined and, thus, signal acquisition and processing in normal operation can be performed (1045).

Figure 11:
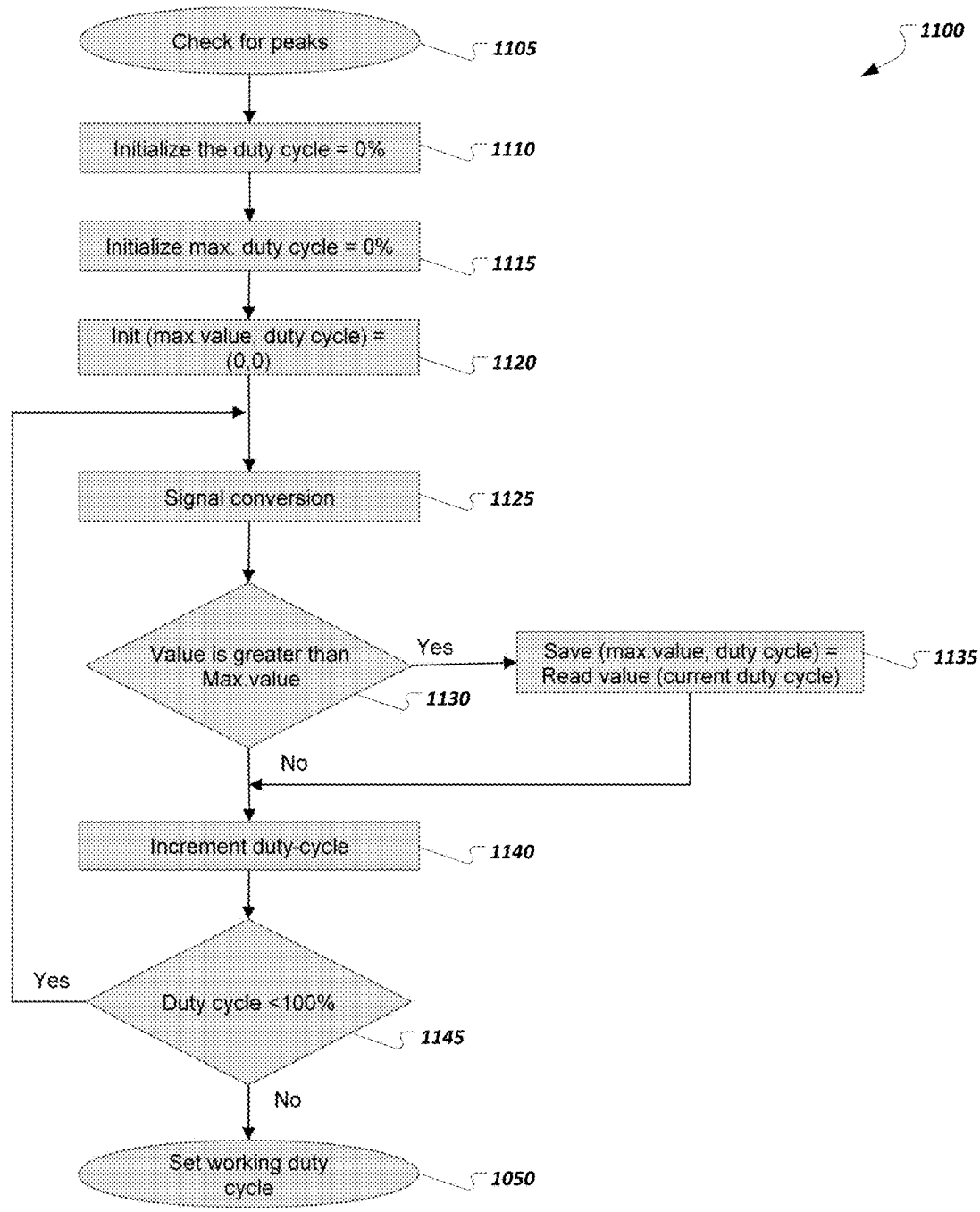
FIG. 11 illustrates an example process of checking for peaks identified by process of FIG. 10.

FIG. 11 illustrates an example process 1100 of analyzing peaks (1105) identified by process 1000. To begin the process, the duty cycle is initialized (1110, 1115, and 1120). The duty cycle is the percentage of one period in which a signal is active, and a period is the time it takes for a signal to complete an on-and-off cycle.

At the beginning both initial and maximum duty cycle are equal to zero (1110, 1115, and 1120). To identify the maximum duty cycle the electrical signal is read, and progressively all values are read (1130) and retained (1135), including each maximum value. In some implementations, the electrical signal uses less than a 100% duty cycle, such as 25%, 50%, or 75%, and if this is the case, it can be set the working duty cycle (1150). If the duty cycle is equal to 100% the process to convert the electrical signal has to be restarted (1145), using another column pair, to enable checking for electrical peaks which can give a duty cycle different from 100%.

In some implementations, the processes 1000 and 1100 occur upon powering of a device that includes the touchscreen. For example, each time a user turns on a mobile phone, the touchscreen circuitry will execute processes 1000 and 1100 to identify a duty cycle. In some implementations, the processes 1000 and 1100 occur once, such as during testing of a newly manufactured mobile phone. Executing the processes 1000 and 1100 increments the duty cycle until a difference between an injected AC signal and an acquired AC signal is maximized or nearly maximized.

To identify a correct duty cycle, the attenuator route (e.g., the attenuator route 815), is activated to cause an artificial difference between the signals read from two adjacent columns. By causing an artificial difference, the differential between two adjacent columns is more prominent, thus enabling the touchscreen to more quickly identify the proper duty cycle. During normal operation of the touchscreen the direct route (e.g., the direct route 820) is activated.

Figure 12:
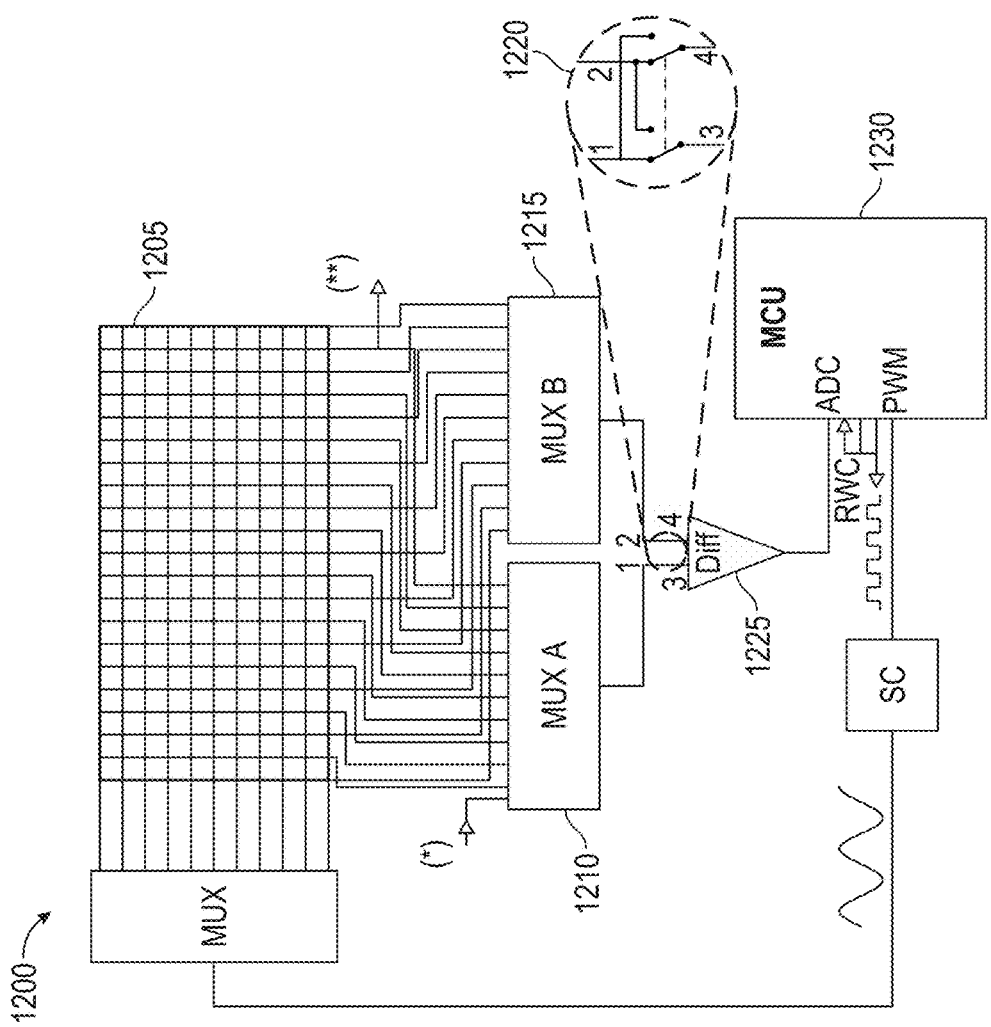
FIG. 12 illustrates an example circuit for polarity normalization.

FIG. 12 is a schematic of a circuit 1200 to perform polarity normalization on a differential operation. In each 56 columns block, for example, column block 1205, there are two multiplexers, for example, multiplexer 1210 and multiplexer 1215. One multiplexer selects the odd columns and the other selects the even columns, thus always selecting one odd column and one even column. The circuit includes a switch 1220. The switch 1220 is a double pole double throw switch that is configured to transmit the output of multiplexer 1210 and the output of multiplexer 1215 to the differential circuit. The differential circuit 1225 may be configured to generate a signal that is the output of the multiplexer 1210 less the output of the multiplexer 1215 or a signal that is the output of the multiplexer 1215 less the output of the multiplexer 1210. Depending on the input configuration of the differential circuit 1225, the switch 1220 may be set so that the differential circuit 1225 generates a signal that is the output of the multiplexer 1210 less the output of the multiplexer 1215 or a signal with the opposite polarity. The processor 1230 receives the differential signal generated by the differential circuit 1225.

Figure 13:
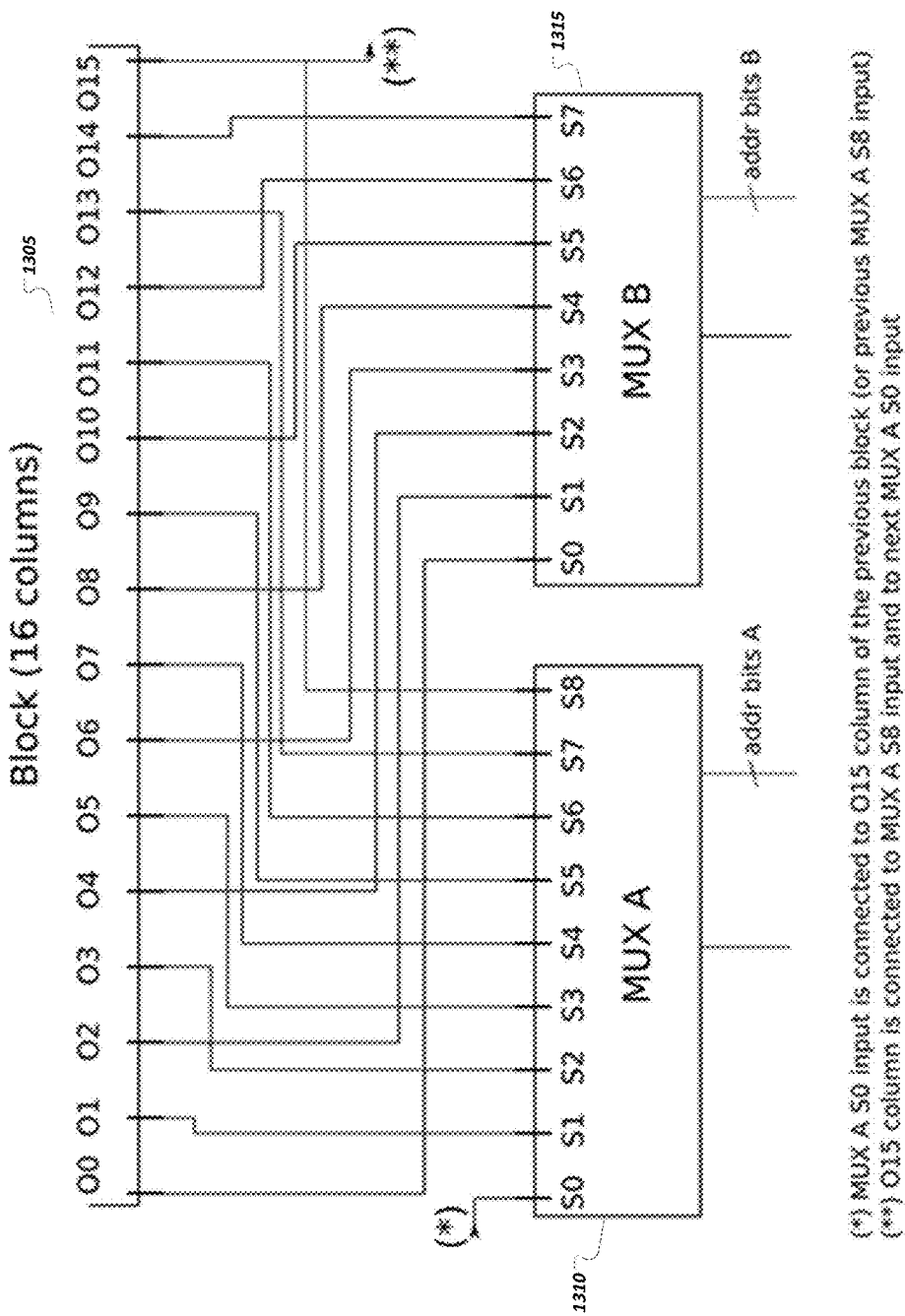
FIG. 13 illustrates the connections of the multiplexers of the circuit for polarity normalization.

In FIG. 13, the connections between the columns of sensor block 1305 and the multiplexers 1310 and 1315 are illustrated in more detail (using a 16 column block). Generally the even numbered columns of sensor block 1305 connect to the inputs of multiplexer 1315, and the odd numbered columns of sensor block 1305 connect to the inputs of the multiplexer 1310. To detect differentials between blocks, one of the inputs of the multiplexer 1310 may be connected to a column from an adjacent block and one of the columns from block 1305 may be connected to a multiplexer that is primarily connected to an adjacent block on the other side of the block 1305.

To read the differential for consecutive columns, FIG. 13 illustrates the following differential pairs for the 16 columns:

TABLE 1

| Mux 1310 input | Mux 1315 input | Block 1305 column (+) Differential input | Block 1305 column (−) Differential input |
|---|---|---|---|
| S0 | S0 | O15 (from block to the left of block 1305) | O0 |
| S1 | S0 | O1 | O0 |
| S1 | S1 | O1 | O2 |
| S2 | S1 | O3 | O2 |
| S2 | S2 | O3 | O4 |
| S3 | S2 | O5 | O4 |
| S3 | S3 | O5 | O6 |
| S4 | S3 | O7 | O6 |
| S4 | S4 | O7 | O8 |
| S5 | S4 | O9 | O8 |
| S5 | S5 | O9 | O10 |
| S6 | S5 | O11 | O10 |
| S6 | S6 | O11 | O12 |
| S7 | S6 | O13 | O12 |
| S7 | S7 | O13 | O14 |
| S8 | S7 | O15 | O14 |

As described in the above Table 1, the S0 input of multiplexer 1310 is not connected to the block 1305. The S0 input shares the O15 column with the previous block, for example, with the S8 input of a corresponding odd column multiplexer in the previous block. This configuration allows selection and differentiation of the last column of the previous block and the first column of the block 1305. Although Table 1 includes the odd columns of block 1315 connected to the positive differential input of the differential circuit and the even columns of block 1315 connected to the negative differential input of the differential circuit, those two columns may be switches. In other words, the even columns may be connected to the positive differential input and the odd columns may be connected to the negative differential input.

Figure 14:
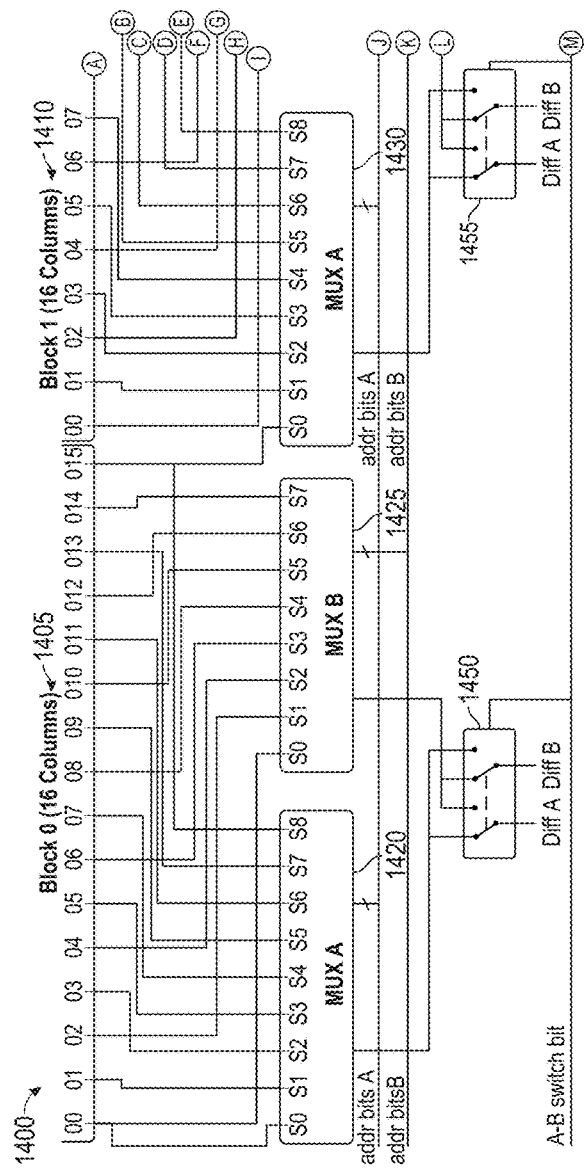
FIG. 14 illustrates example circuits for differential readings of consecutive columns.
Figure 14:
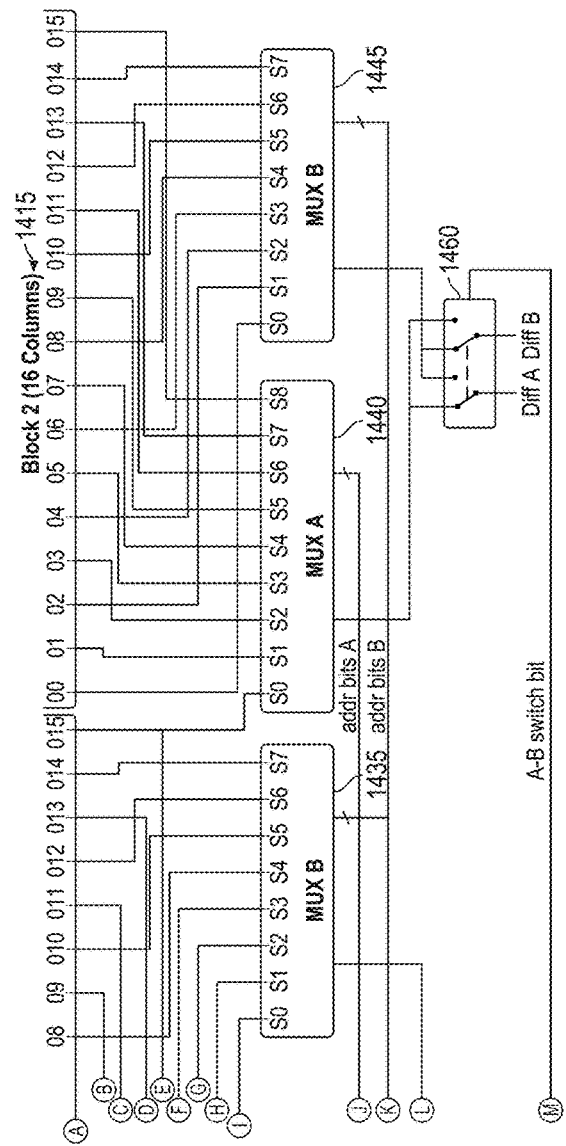

FIG. 14 illustrates data continuity at the block separation zones in circuit 1400. Circuit 1400 includes multiplexers 1405, 1410, and 1415 that each correspond to different blocks of a touch sensor grid. Block 1405 includes the leftmost sixteen columns of the sensor grid. Block 1410 includes the middle sixteen columns of the sensor grid. Block 1415 includes the rightmost sixteen columns of the sensor grid. Each block is connected to two multiplexers, one that is connected to the even columns and the other that is connected to the odd columns. As shown in circuit 1400, multiplexer 1420 is connected to the odd columns of block 1405, and multiplexer 1425 is connected to the even columns of block 1405. Multiplexer 1430 is connected to the odd columns of block 1410, and multiplexer 1435 is connected to the even columns of block 1410. Multiplexer 1440 is connected to the odd columns of block 1415, and multiplexer 1445 is connected to the even columns of block 1415.

The outputs of each multiplexer pair for each block connects to a switch. In some implementations the switch is a double pole double throw switch. Switch 1450 connects to the outputs of multiplexers 1420 and 1425. Switch 1455 connects to the outputs of multiplexers 1430 and 1435. Switch 1460 connects to the outputs of multiplexers 1440 and 1445. Each switch is connected to a differential circuit and is configured to switch a polarity of the multiplexer outputs.

In some implementations, the S0 input from multiplexer 1420 in the first block 1405 is connected, like the S0 input from multiplexer 1425, to O0 column of the same block 1405. Not having previous blocks, and for multiplexer addressing coherence in all blocks and electrical stability at the differential circuits, the first differential value of the first block (Multiplexer 1420, input S0—multiplexer 1425, input S0) will be zero, e.g., the first value from the first block 1405 will always be discarded. In other words, the left most column, column O0, of block 1405, because it is on the edge of the sensor grid, will only be read when paired with column O1 of block 1405.

The differential readings of N columns (having N as an even number) will return N−1 valid values and 1 dummy value to be discarded. In some implementations, there are 168 columns, which will provide 167 valid values and 1 dummy value. In circuit 1400, the 48 columns provide 47 values.

In each block, after the multiplexer pairs, there is a double switch to perform polarity normalization on the differential operation. Using a switch might be necessary because the consecutive multiplexers addressing may invert the column order in each selected pair. In some implementations, the differential circuit has a positive input (diffA) and one negative input (diffB), to which the multiplexer outputs of a respective block are connected. For example, for the first 5 selectable column pairs of block 1410 (as described above):

TABLE 2

| Mux 1430 input | Mux 1435 input | Block 1410 column (+) Differential input | Block 1410 column (−) Differential input |
|---|---|---|---|
| S0 | S0 | O15 (from block 1405) | O0 |
| S1 | S0 | O1 | O0 |
| S1 | S1 | O1 | O2 |
| S2 | S1 | O3 | O2 |
| S2 | S2 | O3 | O4 |

Based on these pairs, columns are layered from left to right (O15 (previous block 1405), O0, O1, O2, O3, and O4). To keep the same polarity at all consecutive differential pairs, the differentials should be computed such that the left column of the working pair is connected to input diffA and the right column of the working pair is connected to input diffB. But, using only the multiplexers addressing, this may only happen with the even address values, while the odd address values invert the columns positions that are related to the differential inputs diffA and diffB:

TABLE 3

| Mux 1430 input | Mux 1435 input | Block 1410 column (+) Differential input, diffA of switch 1455 | Block 1410 column (−) Differential input, diffB of switch 1455 | Polarity |
|---|---|---|---|---|
| S0 | S0 | O15 (from block 1405) | O0 | Correct |
| S1 | S0 | O1 | O0 | Inverted |
| S1 | S1 | O1 | O2 | Correct |
| S2 | S1 | O3 | O2 | Inverted |
| S2 | S2 | O3 | O4 | Correct |

The double switch 1455 solves this issue where the polarity is inverted by switching the columns right before the differential inputs when the address value is odd. The address value least significant bit is used to activate the double switches.

Connecting some of the columns to more than one multiplexer inputs may require that some of the multiplexers include additional inputs. A block of sixteen columns may require more than just two multiplexers each with eight inputs. Instead, one of the multiplexers may require nine inputs. For example, multiplexers 1430 includes nine inputs because the O15 column of block 1405 is connected to input S8 of multiplexer 1420 and input S0 of multiplexer 1430. Multiplexer 1430 still requires another eight inputs to connect to the odd columns of block 1410.

Figure 14A:
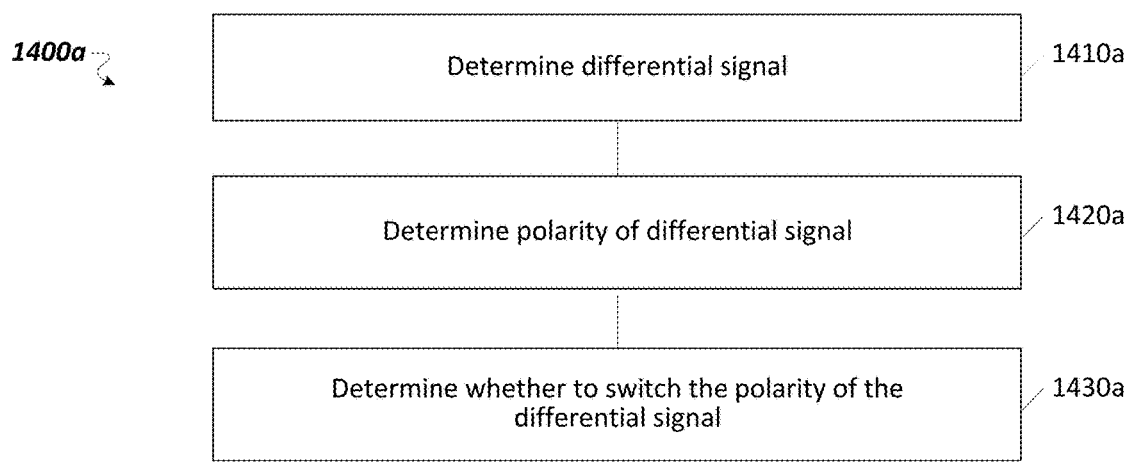
FIG. 14A illustrates an example process for polarity normalization.

FIG. 14A illustrates an example process 1400a for polarity normalization. The process 1400a may be performed by the control circuitry of a touch screen, for example, the circuitry illustrated in FIGS. 12-14.

The circuit receives a differential signal (1410a). The differential signal is based on the difference between two signals that are received from a first multiplexer and a second multiplexer that are connected to a touch screen sensor grid. Each multiplexer is connected to half of the columns of the touch screen sensor grid. In some implementations, the first multiplexer is connected to the odd numbered columns and the second multiplexer is connected to the even numbered columns. The differential signal is the signal from the first multiplexer minus the signal from the second multiplexer.

The circuit determines a polarity of the differential signal (1420a). The polarity of a signal is based on which order the input signals are differentiated. The difference of a first signal minus a second signal is not equal to a difference of the second signal minus the first signal. To maintain consistent differential reading from the touch screen, the circuit may compute differential signal as the left column signal minus the right column signal. The opposite may also be the case, but for accuracy, the differential signal polarity should be consistent. To determine the polarity, the circuit may read the addresses provided to the first multiplexer or the second multiplexer. For example, the circuit may use the least significant bits of the addresses provided to the first multiplexer and the second multiplexer to determine the polarity.

The circuit determines whether to switch the polarity of the differential signal (1430a). To switch the polarity the circuit engages a double pole double throw switch that switches the inputs of the differential circuit. For example, if the output from the first multiplexer was transmitted to the plus terminal of the differential circuit and the output from the second multiplexer was transmitted to the minus terminal of the differential circuit, then engaging the switch would flip the inputs to the differential circuit so that the second multiplexer was transmitted to the plus terminal and the first multiplexer was transmitted to the minus terminal. A determination on whether to switch the polarity may be based on logic involving the least significant bits of the addresses provided to the first multiplexer and the second multiplexer to determine the polarity. In some implementations, the polarity circuit may switch the polarity when the least significant bits are equal. In other implementations, the polarity circuit may switch the polarity when the least significant bits are not equal.

Figure 15:
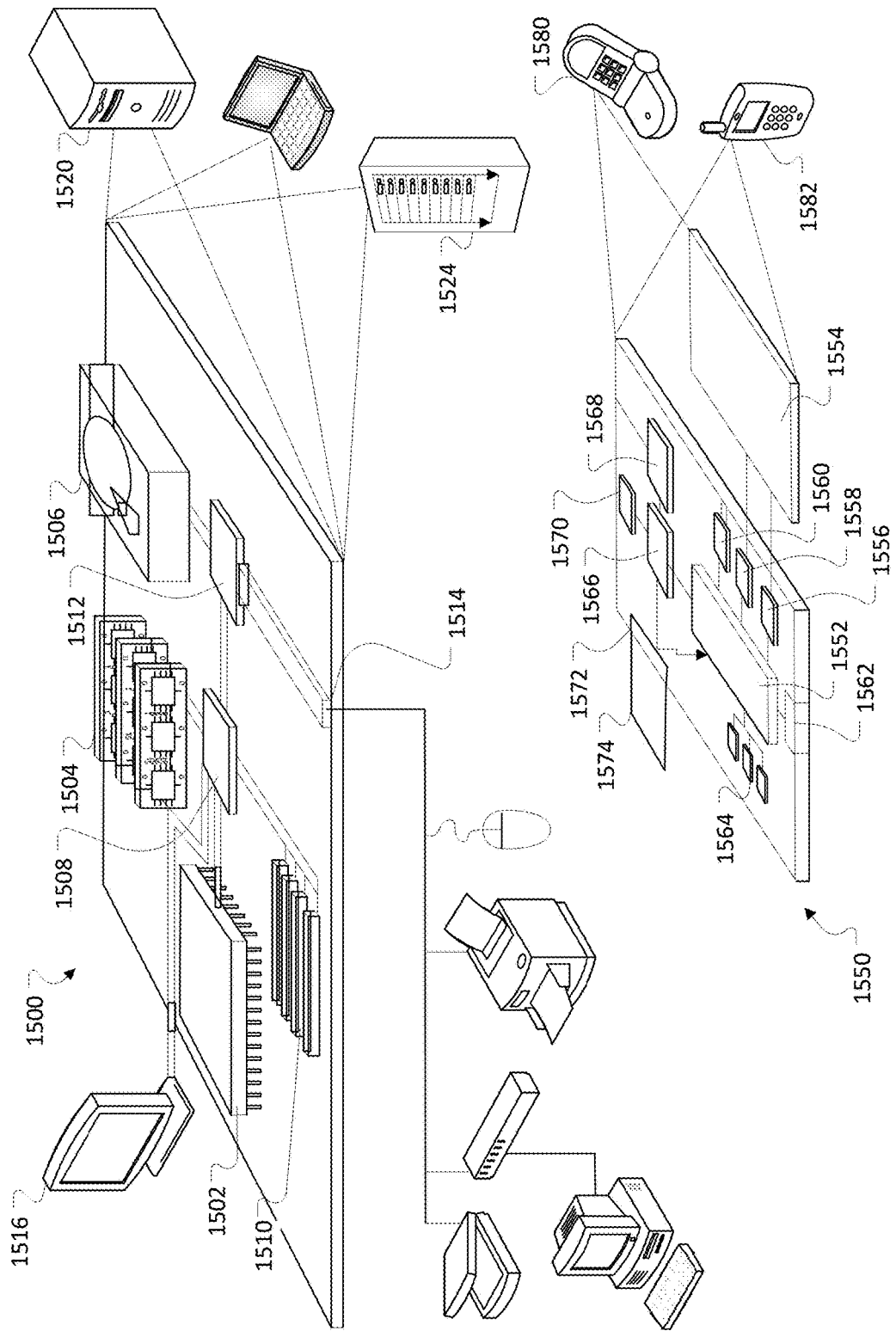
FIG. 15 shows an example of a computing device and a mobile computing device that can be used to implement the techniques described here.

FIG. 15 shows an example of a computing device 1500 and a mobile computing device 1550 that can be used to implement the techniques and methods (e.g. the methods described in context of FIGS. 10 and 11) described here. The computing device 1500 is intended to represent various forms of digital computers, such as laptops, desktops, workstations, personal digital assistants, servers, blade servers, mainframes, and other appropriate computers. The mobile computing device 1550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1500 includes a processor 1502, a memory 1504, a storage device 1506, a high-speed interface 1508 connecting to the memory 1504 and multiple high-speed expansion ports 1510, and a low-speed interface 1512 connecting to a low-speed expansion port 1514 and the storage device 1506. Each of the processor 1502, the memory 1504, the storage device 1506, the high-speed interface 1508, the high-speed expansion ports 1510, and the low-speed interface 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as a display 1516 coupled to the high-speed interface 1508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1504 stores information within the computing device 1500. In some implementations, the memory 1504 is a volatile memory unit or units. In some implementations, the memory 1504 is a non-volatile memory unit or units. The memory 1504 may also be another form of computer-readable medium, such as a magnetic or optical disk.

The storage device 1506 is capable of providing mass storage for the computing device 1500. In some implementations, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1502), perform one or more methods, such as those described above. The instructions can also be stored by one or more storage devices such as computer- or machine-readable mediums (for example, the memory 1504, the storage device 1506, or memory on the processor 1502).

The high-speed interface 1508 manages bandwidth-intensive operations for the computing device 1500, while the low-speed interface 1512 manages lower bandwidth-intensive operations. Such allocation of functions is an example only. In some implementations, the high-speed interface 1508 is coupled to the memory 1504, the display 1516 (e.g., through a graphics processor or accelerator), and to the high-speed expansion ports 1510, which may accept various expansion cards (not shown). In the implementation, the low-speed interface 1512 is coupled to the storage device 1506 and the low-speed expansion port 1514. The low-speed expansion port 1514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. In addition, it may be implemented in a personal computer such as a laptop computer 1522. It may also be implemented as part of a rack server system 1524. Alternatively, components from the computing device 1500 may be combined with other components in a mobile device (not shown), such as a mobile computing device 1550. Each of such devices may contain one or more of the computing device 1500 and the mobile computing device 1550, and an entire system may be made up of multiple computing devices communicating with each other.

The mobile computing device 1550 includes a processor 1552, a memory 1564, an input/output device such as a display 1554, a communication interface 1566, and a transceiver 1568, among other components. The mobile computing device 1550 may also be provided with a storage device, such as a micro-drive or other device, to provide additional storage. Each of the processor 1552, the memory 1564, the display 1554, the communication interface 1566, and the transceiver 1568, are interconnected using various buses, and several of the components may be mounted on a common motherboard or in other manners as appropriate.

The processor 1552 can execute instructions within the mobile computing device 1550, including instructions stored in the memory 1564. The processor 1552 may be implemented as a chipset of chips that include separate and multiple analog and digital processors. The processor 1552 may provide, for example, for coordination of the other components of the mobile computing device 1550, such as control of user interfaces, applications run by the mobile computing device 1550, and wireless communication by the mobile computing device 1550.

The processor 1552 may communicate with a user through a control interface 1558 and a display interface 1556 coupled to the display 1554. The display 1554 may be, for example, a TFT (Thin-Film-Transistor Liquid Crystal Display) display or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may provide communication with the processor 1552, so as to enable near area communication of the mobile computing device 1550 with other devices. The external interface 1562 may provide, for example, for wired communication in some implementations, or for wireless communication in other implementations, and multiple interfaces may also be used.

The memory 1565 stores information within the mobile computing device 1550. The memory 1564 can be implemented as one or more of a computer-readable medium or media, a volatile memory unit or units, or a non-volatile memory unit or units. An expansion memory 1574 may also be provided and connected to the mobile computing device 1550 through an expansion interface 1572, which may include, for example, a SIMM (Single In Line Memory Module) card interface. The expansion memory 1574 may provide extra storage space for the mobile computing device 1550, or may also store applications or other information for the mobile computing device 1550. Specifically, the expansion memory 1574 may include instructions to carry out or supplement the processes described above, and may include secure information also. Thus, for example, the expansion memory 1574 may be provide as a security module for the mobile computing device 1550, and may be programmed with instructions that permit secure use of the mobile computing device 1550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1552), perform one or more methods, such as those described above. The instructions can also be stored by one or more storage devices, such as one or more computer- or machine-readable mediums (for example, the memory 1564, the expansion memory 1574, or memory on the processor 1552). In some implementations, the instructions can be received in a propagated signal, for example, over the transceiver 1568 or the external interface 1562.

The mobile computing device 1550 may communicate wirelessly through the communication interface 1566, which may include digital signal processing circuitry where necessary. The communication interface 1566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1568 using a radio-frequency. In addition, short-range communication may occur, such as using a Bluetooth, WiFi, or other such transceiver (not shown). In addition, a GPS (Global Positioning System) receiver module 1570 may provide additional navigation- and location-related wireless data to the mobile computing device 1550, which may be used as appropriate by applications running on the mobile computing device 1550.

The mobile computing device 1550 may also communicate audibly using an audio codec 1560, which may receive spoken information from a user and convert it to usable digital information. The audio codec 1560 may likewise generate audible sound for a user, such as through a speaker, e.g., in a handset of the mobile computing device 1550. Such sound may include sound from voice telephone calls, may include recorded sound (e.g., voice messages, music files, etc.) and may also include sound generated by applications operating on the mobile computing device 1550.

The mobile computing device 1550 may be implemented in a number of different forms, as shown in the figure. For example, it may be implemented as a cellular telephone 1580. It may also be implemented as part of a smart-phone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A projected capacitive touch sensor, comprising:
    a sensor grid including one or more electrically conductive rows and one or more electrically conductive columns;
    a first column multiplexer that is connected to a first portion of the one or more electrically conductive columns;
    a second column multiplexer that is connected to a second portion of the one or more electrically conductive columns;
    a polarity switching circuit that is configured to:
        receive a first address signal provided to the first column multiplexer;
        receive a second address signal provided to the second column multiplexer;
        compare the first address signal to the second address signal;
        based on comparing the first address signal to the second address signal, determine a polarity of a differential signal generated from an output of the first column multiplexer and an output of the second column multiplexer; and
        based on determining the polarity of the differential signal, determining whether to switch the polarity of the differential signal.

2. The sensor of claim 1, wherein the polarity switching circuit is configured to determine a polarity of the differential signal based on (i) a first location of a first electrically conductive column selected as the output of the first column multiplexer and (ii) a second location of a second electrically conductive column selected as the output of the second column multiplexer.

3. The sensor of claim 1, wherein the first portion of the one or more electrically conductive columns and the second portion of the one or more electrically conductive columns are interleaved.

4. The sensor of claim 1, wherein an electrically conductive column located on an edge of the sensor grid is connected to both the first column multiplexer and the second column multiplexer.

5. The sensor of claim 1, wherein:
    determining the polarity of the differential signal comprises determining that the differential signal is based on the output of the first column multiplexer minus the output of the second column multiplexer, and
    determining whether to switch the polarity of the differential signal comprises determining not to switch the polarity of the differential signal.

6. The sensor of claim 1, wherein:
    determining the polarity of the differential signal comprises determining that the differential signal is based on the output of the second column multiplexer minus the output of the first column multiplexer, and
    determining whether to switch the polarity of the differential signal comprises determining to switch the polarity of the differential signal.

7. The sensor of claim 1, comprising:
    a third column multiplexer that is connected to a third portion of the one or more electrically conductive columns;
    a fourth column multiplexer that is connected to a fourth portion of the one or more electrically conductive columns; and
    an additional polarity switching circuit that is configured to:
        determine a polarity of an additional differential signal generated from an output of the third column multiplexer and an output of the fourth column multiplexer; and
        based on determining the polarity of the additional differential signal, determining whether to switch the polarity of the differential signal,
    wherein a first block of consecutive electrically conductive columns of the sensor grid includes the first portion of the one or more electrically conductive columns and the second portion of the one or more electrically conductive columns, and
    wherein a second block of consecutive electrically conductive columns of the sensor grid includes the third portion of the one or more electrically conductive columns and the fourth portion of the one or more electrically conductive columns.

8. The sensor of claim 7, wherein an electrically conductive column located in the first block is connected to both the first column multiplexer and the third column multiplexer.

9. The sensor of claim 7, wherein a first electrically conductive column selected as the output of the third column multiplexer is adjacent to a second electrically conductive column selected as the output of the fourth column multiplexer, the first electrically conductive column being located in the second block and the second electrically conductive column being located in the first block.

10. The sensor of claim 1, wherein the polarity switching circuit is a double pole double throw switch.

11. The sensor of claim 1, wherein a first electrically conductive column selected as the output of the first column multiplexer is adjacent to a second electrically conductive column selected as the output of the second column multiplexer.

12. The sensor of claim 1, wherein the first column multiplexer includes one more input than the second column multiplexer.

13. A method comprising:
    determining a differential signal that is based on an output of a first column multiplexer and an output of a second column multiplexer, wherein the first column multiplexer is connected to a first portion of one or more electrically conductive columns of a sensor grid and the second column multiplexer is connected to a second portion of the one or more electrically conductive columns of the sensor grid;
    receiving a first address signal provided to the first column multiplexer;
    receiving a second address signal provided to the second column multiplexer;
    comparing the first address signal to the second address signal;
    based on comparing the first address signal to the second address signal, determining a polarity of the differential signal; and based on determining the polarity of the differential signal, determining whether to switch the polarity of the differential signal.

14. The method of claim 13, wherein determining a polarity of the differential signal is based on (i) a first location of a first electrically conductive column selected as the output of the first column multiplexer and (ii) a second location of a second electrically conductive column selected as the output of the second column multiplexer.

15. The method of claim 13, wherein:
determining the polarity of the differential signal comprises determining that the differential signal is based on the output of the second column multiplexer minus the output of the first column multiplexer, and
determining whether to switch the polarity of the differential signal comprises determining to switch the polarity of the differential signal.

16. The method of claim 13, wherein a first electrically conductive column selected as the output of the first column multiplexer is adjacent to a second electrically conductive column selected as the output of the second column multiplexer.

17. The method of claim 13, comprising:
determining an additional differential signal that is based on an output of a third column multiplexer and an output of a fourth column multiplexer, wherein the third column multiplexer is connected to a third portion of one or more electrically conductive columns of a sensor grid and the fourth column multiplexer is connected to a fourth portion of the one or more electrically conductive columns of the sensor grid;
determining a polarity of the additional differential signal; and
based on determining the polarity of the additional differential signal, determining whether to switch the polarity of the additional differential signal,
wherein a first block of consecutive electrically conductive columns of the sensor grid includes the first portion of the one or more electrically conductive columns and the second portion of the one or more electrically conductive columns, and
wherein a second block of consecutive electrically conductive columns of the sensor grid includes the third portion of the one or more electrically conductive columns and the fourth portion of the one or more electrically conductive columns.

18. A method comprising:
receiving an output of a first column multiplexer and an output of a second column multiplexer, wherein the first column multiplexer is connected to a first portion of one or more electrically conductive columns of a sensor grid and the second column multiplexer is connected to a second portion of the one or more electrically conductive columns of the sensor grid;
receiving a bit of a first address signal provided to the first column multiplexer;
receiving a bit of a second address signal provided to the second column multiplexer;
comparing the bit of the first address signal provided to the first column multiplexer with the bit of the second address signal provided to the second column multiplexer; and
based on comparing the bit of the first address signal provided to the first column multiplexer with the bit of the second address signal provided to the second column multiplexer, determining whether to switch a polarity of a differential signal generated based on the output of the first column multiplexer and the output of the second column multiplexer.

19. The method of claim 18, wherein determining whether to switch a polarity of a differential signal generated based on the output of the first column multiplexer and the output of the second column multiplexer comprises determining to switch the polarity of the differential signal generated based on the output of the first column multiplexer and the output of the second column multiplexer in response to comparing the bit of the first address signal provided to the first column multiplexer that matches the bit of the second address signal provided to the second column multiplexer.

20. The method of claim 18, wherein determining whether to switch a polarity of a differential signal generated based on the output of the first column multiplexer and the output of the second column multiplexer comprises determining not to switch the polarity of the differential signal generated based on the output of the first column multiplexer and the output of the second column multiplexer in response to comparing the bit of the first address signal provided to the first column multiplexer that does not match the bit of the second address signal provided to the second column multiplexer.

* * * * *